US008874613B2

(12) United States Patent
Gorelik et al.

(10) Patent No.: US 8,874,613 B2
(45) Date of Patent: Oct. 28, 2014

(54) SEMANTIC DISCOVERY AND MAPPING BETWEEN DATA SOURCES

(71) Applicant: International Business Machines Corporation, Armonk, NY (US)

(72) Inventors: Alexander Gorelik, Palo Alto, CA (US); Lingling Yan, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/891,130

(22) Filed: May 9, 2013

(65) Prior Publication Data
US 2013/0254183 A1 Sep. 26, 2013

Related U.S. Application Data

(60) Division of application No. 13/267,292, filed on Oct. 6, 2011, now Pat. No. 8,442,999, which is a division of application No. 12/283,477, filed on Sep. 12, 2008, now Pat. No. 8,082,243, which is a continuation of application No. 10/938,205, filed on Sep. 9, 2004, now Pat. No. 7,426,520.

(60) Provisional application No. 60/502,043, filed on Sep. 10, 2003.

(51) Int. Cl.
*G06F 17/30* (2006.01)

(52) U.S. Cl.
CPC ..................... *G06F 17/30* (2013.01)
USPC ............ 707/791; 707/802; 707/822; 707/828

(58) Field of Classification Search
CPC ....................................................... G06F 17/30
USPC ................................................. 707/600–899
See application file for complete search history.

(56) References Cited

U.S. PATENT DOCUMENTS 5,594,900 A 1/1997 Cohn et al.
5,615,341 A 3/1997 Agrawal et al.
(Continued)

FOREIGN PATENT DOCUMENTS

CN 1435781 A 8/2003
CN 1145901 C 4/2004
(Continued)

OTHER PUBLICATIONS

"Procedure Oriented Programming (POP) vs Object Oriented Programming (OOP)", [online], [Retrieved on Oct. 10, 2012]. Retrieved from the Internet at <URL: http://hacksnpasses.blogspot.com/2011/05/procedure-oriented-programmingpop-vs.html>, Thursday, May 26, 2011, Total 8 pp.
(Continued)

*Primary Examiner* — Isaac M Woo
(74) *Attorney, Agent, or Firm* — David W. Victor; Konrad, Raynes, Davda & Victor LLP

(57) ABSTRACT

An apparatus and method are described for the discovery of semantics, relationships and mappings between data in different software applications, databases, files, reports, messages, or systems. In one aspect, semantics and relationships and mappings are identified between a first and a second data source. A binding condition is discovered between portions of data in the first and the second data source. The binding condition is used to discover correlations between portions of data in the first and the second data source. The binding condition and the correlations are used to discover a transformation function between portions of data in the first and the second data source.

6 Claims, 10 Drawing Sheets

(56) References Cited

U.S. PATENT DOCUMENTS

| | | | |
|---|---|---|---|
| 5,675,785 A | 10/1997 | Hall et al. |
| 5,692,107 A | 11/1997 | Simoudis et al. |
| 5,794,209 A | 8/1998 | Agrawal et al. |
| 5,806,066 A | 9/1998 | Golshani et al. |
| 5,809,297 A | 9/1998 | Kroenke et al. |
| 5,813,002 A | 9/1998 | Agrawal et al. |
| 5,943,667 A | 8/1999 | Aggarwal et al. |
| 5,978,796 A | 11/1999 | Malloy et al. |
| 6,026,392 A | 2/2000 | Kouchi et al. |
| 6,049,797 A | 4/2000 | Guha et al. |
| 6,078,918 A | 6/2000 | Allen et al. |
| 6,092,064 A | 7/2000 | Aggarwal et al. |
| 6,112,198 A | 8/2000 | Lohman et al. |
| 6,182,070 B1 | 1/2001 | Megiddo et al. |
| 6,185,549 B1 | 2/2001 | Rastogi et al. |
| 6,226,649 B1 | 5/2001 | Bodamer et al. |
| 6,272,478 B1 | 8/2001 | Obata et al. |
| 6,278,997 B1 | 8/2001 | Agrawal et al. |
| 6,298,342 B1 | 10/2001 | Graefe et al. |
| 6,301,575 B1 | 10/2001 | Chadha et al. |
| 6,311,173 B1 | 10/2001 | Levin et al. |
| 6,311,179 B1 | 10/2001 | Agarwal et al. |
| 6,317,735 B1 | 11/2001 | Morimoto |
| 6,339,775 B1 | 1/2002 | Zamanian et al. |
| 6,393,424 B1 | 5/2002 | Hallman et al. |
| 6,542,881 B1 | 4/2003 | Meidan et al. |
| 6,594,653 B2 * | 7/2003 | Colby et al. ......................... 1/1 |
| 6,604,095 B1 | 8/2003 | Cesare et al. |
| 6,609,123 B1 | 8/2003 | Cazemier et al. |
| 6,836,773 B2 | 12/2004 | Tamayo et al. |
| 6,850,947 B1 | 2/2005 | Chung et al. |
| 6,877,012 B2 | 4/2005 | Ashida et al. |
| 6,941,303 B2 | 9/2005 | Perrizo |
| 6,954,756 B2 | 10/2005 | Arning et al. |
| 6,965,888 B1 | 11/2005 | Cesare et al. |
| 6,973,459 B1 | 12/2005 | Yarmus |
| 7,007,020 B1 | 2/2006 | Chen et al. |
| 7,028,288 B2 | 4/2006 | Wall et al. |
| 7,249,118 B2 | 7/2007 | Sandler et al. |
| 7,266,537 B2 | 9/2007 | Jacobsen et al. |
| 7,426,520 B2 | 9/2008 | Gorelik et al. |
| 7,490,106 B2 | 2/2009 | Dumitru et al. |
| 7,644,361 B2 | 1/2010 | Wu et al. |
| 7,680,828 B2 | 3/2010 | Gorelik |
| 7,702,694 B1 | 4/2010 | Perkins et al. |
| 7,836,004 B2 | 11/2010 | Roth et al. |
| 8,166,000 B2 | 4/2012 | Labrie et al. |
| 8,171,001 B2 | 5/2012 | Roth et al. |
| 2002/0091707 A1 | 7/2002 | Keller |
| 2002/0178170 A1 | 11/2002 | Britton et al. |
| 2003/0115280 A1 | 6/2003 | Quine et al. |
| 2003/0126056 A1 | 7/2003 | Hausman et al. |
| 2003/0158850 A1 | 8/2003 | Lawrence et al. |
| 2003/0191667 A1 | 10/2003 | Fitzgerald et al. |
| 2003/0212678 A1 | 11/2003 | Bloom et al. |
| 2003/0217069 A1 | 11/2003 | Fagin et al. |
| 2004/0015783 A1 | 1/2004 | Lennon et al. |
| 2004/0093344 A1 | 5/2004 | Berger et al. |
| 2004/0093559 A1 | 5/2004 | Amaru et al. |
| 2004/0189708 A1 | 9/2004 | Larcheveque et al. |
| 2004/0226002 A1 | 11/2004 | Larcheveque et al. |
| 2005/0055369 A1 | 3/2005 | Gorelik et al. |
| 2005/0060313 A1 | 3/2005 | Naimat et al. |
| 2005/0066240 A1 | 3/2005 | Sykes et al. |
| 2005/0066263 A1 | 3/2005 | Baugher |
| 2005/0086250 A1 | 4/2005 | Richardson |
| 2005/0108631 A1 | 5/2005 | Amorin et al. |
| 2005/0144552 A1 | 6/2005 | Kalthoff et al. |
| 2005/0182739 A1 | 8/2005 | Dasu et al. |
| 2005/0234688 A1 | 10/2005 | Pinto et al. |
| 2005/0256892 A1 | 11/2005 | Harken |
| 2005/0278308 A1 | 12/2005 | Barstow |
| 2006/0004740 A1 | 1/2006 | Dettinger et al. |
| 2006/0004750 A1 | 1/2006 | Huang et al. |
| 2006/0053382 A1 | 3/2006 | Gardner et al. |
| 2006/0106847 A1 | 5/2006 | Eckardt, III et al. |
| 2006/0136461 A1 | 6/2006 | Lee et al. |
| 2006/0136462 A1 | 6/2006 | Campos et al. |
| 2006/0167579 A1 | 7/2006 | Fujii et al. |
| 2006/0253435 A1 | 11/2006 | Nishizawa et al. |
| 2006/0271528 A1 | 11/2006 | Gorelik |
| 2006/0274760 A1 | 12/2006 | Loher |
| 2007/0073688 A1 | 3/2007 | Fry |
| 2007/0106785 A1 | 5/2007 | Tandon |
| 2007/0156790 A1 | 7/2007 | Sun Hsu et al. |
| 2007/0179959 A1 | 8/2007 | Sharma et al. |
| 2007/0239769 A1 | 10/2007 | Fazal et al. |
| 2007/0294221 A1 | 12/2007 | Chen et al. |
| 2008/0005183 A1 | 1/2008 | Bostick et al. |
| 2008/0027899 A1 | 1/2008 | Khunteta et al. |
| 2008/0085742 A1 | 4/2008 | Karukka et al. |
| 2008/0243823 A1 | 10/2008 | Baris et al. |
| 2009/0024551 A1 | 1/2009 | Agrawal et al. |
| 2009/0094274 A1 | 4/2009 | Gorelik et al. |
| 2009/0204631 A1 | 8/2009 | Pomroy et al. |
| 2009/0281974 A1 | 11/2009 | Saxena et al. |
| 2009/0327208 A1 | 12/2009 | Bittner et al. |
| 2011/0246503 A1 | 10/2011 | Bender et al. |
| 2012/0078913 A1 | 3/2012 | Muni et al. |
| 2012/0158745 A1 | 6/2012 | Gorelik et al. |

FOREIGN PATENT DOCUMENTS

| | | | |
|---|---|---|---|
| WO | 0137135 A2 | 5/2001 |
| WO | 0175679 A1 | 10/2001 |
| WO | 02073468 A1 | 9/2002 |

OTHER PUBLICATIONS

U.S. Appl. No. 13/435,352, filed Mar. 30, 2012, entitled "Discovering Pivot Type Relationships Between Database Objects", invented by Burda, L., S. Datta, A. Gorelik, D. Ren, and L.M. Tsentsiper, Total 48 pp.

Baldwin, R.T., "Views, Objects, and Persistence for Accessing a High Volume Global Data Set", National Climatic Data Center, © 2003, Total 5 pp.

Informatica, The Data Integration Company, "Enterprise Data Integration—Maximizing the Business Value of your Enterprise Data", Feb. 24, 2006, Total 9 pp.

International Preliminary Report, Mar. 13, 2006, for PCT/US2004/029631, Total 4 pp.

Written Opinion, Mar. 10, 2006, for PCT/US04/29631, Total 3 pp.

"Principles of Object Oriented Programming", Total 7 pp.

Saracco, C.M., J. Labrie, and S. Brodsky, [online]. Retrieved from the Internet at <URL: http://www.ibm.com/developerworks/data/library/techarticle/dm-0407saracco/>, "Using Service Data Objects with Enterprise Information Integration Technology", IBM, Jul. 1, 2004, pp. 1-14. [Also Total 14 pp].

International Search Report, Mar. 23, 2006, for PCT/US2004/029631, Total 3 pp.

Notice of Allowance 3, Nov. 9, 2012, for U.S. Appl. No. 11/779,251, filed Jul. 17, 2007 by G. Agrawal et al., Total 24 pp.

Preliminary Amendment, Oct. 6, 2011, for U.S. Appl. No. 13/267,292, filed Oct. 6, 2011 by A. Gorelik et al., Total 8 pp.

Office Action 1, Aug. 29, 2012, for U.S. Appl. No. 13/267,292, filed Oct. 6, 2011 by A. Gorelik et al., Total 23 pp.

Restriction Requirement, Jul. 9, 2012, for U.S. Appl. No. 13/267,292, filed Oct. 6, 2011 by A. Gorelik et al., Total 8 pp.

Response to Restriction Requirement, Aug. 9, 2012, for U.S. Appl. No. 13/267,292, filed Oct. 6, 2011 by A. Gorelik et al., Total 1 p.

Amendment 1, Nov. 29, 2012, for U.S. Appl. No. 13/267,292, filed Oct. 6, 2011 by A. Gorelik et al., Total 6 pp.

Amendment 1, Jan. 11, 2008, for U.S. Appl. No. 10/938,205, filed Sep. 9, 2004 by Gorelik et al., Total 34 pp.

Notice of Allowance, May 1, 2008, for U.S. Appl. No. 10/938,205, filed Sep. 9, 2004 by Gorelik et al., Total 18 pp.

Office Action 1, Sep. 11, 2007, for U.S. Appl. No. 10/938,205, filed Sep. 9, 2004 by A. Gorelik et al., Total 19 pp.

Restriction Requirement, Jun. 18, 2007, for U.S. Appl. No. 10/938,205, filed Sep. 9, 2004 by Gorelik et al., Total 7 pp.

(56) References Cited

OTHER PUBLICATIONS

Response to Restriction Requirement, Aug. 17, 2007, for U.S. Appl. No. 10/938,205, filed Sep. 9, 2004 by Gorelik et al., Total 4 pp.
Restriction Requirement 2, Feb. 13, 2008, for U.S. Appl. No. 10/938,205, filed Sep. 9, 2004 by Gorelik et al., Total 7 pp.
Response to Restriction Requirement 2, Mar. 12, 2008, for U.S. Appl. No. 10/938,205, filed Sep. 9, 2004 by Gorelik et al., Total 4 pp.
Amendment 1, Jul. 6, 2009, for U.S. Appl. No. 11/499,442, filed Aug. 4, 2006 by Gorelik, A., Total 27 pp.
Notice of Allowance, Oct. 27, 2009, for U.S. Appl. No. 11/499,442, filed Aug. 4, 2006 by A. Gorelik et al., Total 27 pp.
Office Action 1, Mar. 5, 2009, for U.S. Appl. No. 11/499,442, filed Aug. 4, 2006 by A. Gorelik et al., Total 22 pp.
Amendment 1, Jul. 26, 2011, for U.S. Appl. No. 12/283,477, filed Sep. 12, 2008 by Gorelik et al., Total 21 pp.
Amendment 2, Nov. 9, 2011, for U.S. Appl. No. 12/283,477, filed Sep. 12, 2008 by Gorelik et al., Total 4 pp.
Notice of Allowance, Aug. 10, 2011, for U.S. Appl. No. 12/283,477, filed Sep. 12, 2008 by Gorelik et al., Total 14 pp.
Office Action 1, Apr. 26, 2011, for U.S. Appl. No. 12/283,477, filed Sep. 12, 2008 by Gorelik et al., Total 24 pp.
Preliminary Amendment, Dec. 9, 2009, for U.S. Appl. No. 12/283,477, filed Sep. 12, 2008 by Gorelik et al., Total 8 pp.
Restriction Requirement, Mar. 23, 2011, for U.S. Appl. No. 12/283,477, filed Sep. 12, 2008 by Gorelik et al., Total 10 pp.
Response to Restriction Requirement, Apr. 19, 2011, for U.S. Appl. No. 12/283,477, filed Sep. 12, 2008 by Gorelik et al., Total 1 p.
Notice of Allowance 1, Jan. 2, 2013, for U.S. Appl. No. 13/267,292, filed Oct. 6, 2011 by A. Gorelik et al., Total 38 pp.
Office Action 3, Jun. 18, 2013, for U.S. Appl. No. 12/165,549, filed Jun. 30, 2008 by T. Bittner et al., Total 37 pp.
Response to Final Office Action 1 for U.S. Appl. No. 12/165,549, dated Dec. 22, 2011, 15 pp.
Response to Office Action 3 for U.S. Appl. No. 12/165,549, dated Sep. 18, 2013, 15 pp.
Final Office Action 2 for U.S. Appl. No. 12/165,549, dated Oct. 28, 2013, 46 pp.
Response to Office Action 1 for U.S. Appl. No. 12/165,549, dated Sep. 3, 2013, 10 pp.
Final Office Action 1 for U.S. Appl. No. 12/165,549, dated Oct. 31, 2013, 17 pp.
Amendment 1, Aug. 6, 2009, for U.S. Appl. No. 11/609,307, filed Dec. 11, 2006 by M.A. Roth et al., Total 16 pp.
Amendment 1, Jul. 7, 2011, for U.S. Appl. No. 11/769,634, filed Jun. 27, 2007 by M.A. Roth et al., Total 17 pp.
Amendment 1, Jul. 14, 2011, for U.S. Appl. No. 11/769,639, filed Jun. 27, 2007, by J.J. Labrie et al., Total 16 pp.
Amendment 1, Jun. 30, 2011, for U.S. Appl. No. 12/165,549, filed Jun. 30, 2008, by T. Bittner et al., Total 19 pp.
Amendment 2, Mar. 10, 2010, for U.S. Appl. No. 11/609,307, filed Dec. 11, 2006 by M.A. Roth et al., Total 11 pp.
Chinese Office Action, Sep. 4, 2009, for Application No. CN2007101867790, 7 pp.
Data Mining Group, "Association Rules" [online], [Retrieved on Nov. 1, 2006]. Retrieved from the Internet at <URL: http://www.dmg.org/v3-1/AssociationRules.html>, 7 pp.
Data Mining Group, "Trees" [online], [Retrieved on Nov. 1, 2006]. Retrieved from the Internet at <URL: http://www.dmg.org/v3-1/TreeModel.html>, 18 pp.
Final Office Action 1, Dec. 10, 2009, for U.S. Appl. No. 11/609,307, filed Dec. 11, 2006 by M.A. Roth et al., Total 10 pp.
Final Office Action 1, Sep. 22, 2011, for U.S. Appl. No. 12/165,549, filed Jun. 30, 2008, by T. Bittner et al.,Total 31 pp.
Han, E.H., G. Karypis, and V. Kumar, "Scalable Parallel Data Mining for Association Rules", 1997 ACM, Proceedings of the 1997 ACM SIGMOD International Conference on Management of Data, pp. 277-288.

Hipp, J., U. Guntzer, & U. Grimmer, "Data Quality Mining—Making a Virtue of Necessity", Proceedings of the 6th ACM SIGMOD Workshop on Research Issues in Data Mining and Knowledge Discovery, 2001, pp. 52-57.
Kache, H., Y. Saillet, and M. Roth, "Transformation Rule Discovery through Data Mining", 2008 ACM, VLDB '08, Aug. 24-30, 2008, VLDB Endowment, Total 4 pp.
Knobbe, A.J., "Multi-Relational Data Mining", Nov. 22, 2004, 130 pp.
Korn, F., A. Labrinidis, Y. Kotidis, & C. Faloutsos, "Quantifiable Data Mining Using Ratio Rules", The VLDB Journal, 2000, pp. 254-266.
Marcus, A., J.I. Maletic, & K. Lin, "Ordinal Association Rules for Error Identification in Data Sets", Proceedings of the Tenth International Conference on Information and Knowledge Management, 2001, pp. 589-591. vol. 38, No. 2, Feb. 1995, pp. 317-318.
Morgan, Reish, Stone, Swearingen, "Implementation of Comprehensive Qualification and Validation of Entry Fields", TDB.
Muller, H., U. Leser, & J. Freytag, "Mining for Patterns in Contradictory Data", Proceedings of the 2004 International Workshop on Information Quality in Information Systems, 2004, pp. 51-58.
Notice of Allowance 1, Sep. 20, 2011, for U.S. Appl. No. 11/769,634, filed Jun. 27, 2007 by M.A. Roth et al., Total 19 pp.
Notice of Allowance 1, Sep. 22, 2011, for U.S. Appl. No. 11/769,639, filed Jun. 27, 2007, by J.J. Labrie et al., Total 19 pp.
Notice of Allowance 1, Apr. 19, 2010, for U.S. Appl. No. 11/609,307, filed Dec. 11, 2006 by M.A. Roth et al., Total 11 pp.
Notice of Allowance 2, Jun. 28, 2010, for U.S. Appl. No. 11/609,307, filed Dec. 11, 2006 by M.A. Roth et al., Total 9 pp.
Notice of Allowance 2, Dec. 14, 2011, for U.S. Appl. No. 11/769,639, filed Jun. 27, 2007 by J.J. Labrie et al., Total 15 pp.
Notice of Allowance 2, Dec. 28, 2011, for U.S. Appl. No. 11/769,634, filed Jun. 27, 2007 by M.A. Roth et al., Total 15 pp.
Office Action 1, Apr. 7, 2011, for U.S. Appl. No. 11/769,634, filed Jun. 27, 2007 by M.A. Roth et al., Total 40 pp.
Office Action 1, Mar. 30, 2011, for U.S. Appl. No. 12/165,549, filed Jun. 30, 2008, by T. Bittner et al., Total 39 pp.
Office Action 1, Apr. 6, 2009, for U.S. Appl. No. 11/609,307, filed Dec. 11, 2006 by M.A. Roth et al., Total 26 pp.
Pudi, V., "Data Mining—Association Rules", [online], [retrieved on Nov. 1, 2006], retrieved from the Internet at <URL: http://www.iiit.ac.in/~vikram/mining.html>, 3 pp.
Seekamp, C. and K. Britton, "Dynamic Generation of Rules from Properties to Improve Rule Processing Performance", RD No. 429, Jan. 2000, pp. 172.
Shekhar, S., B. Hamidzadeh, A. Kohli, & M. Coyle, "Learning Transformation Rules for Semantic Query Optimization: A Data-Driven Approach", IEEE Transactions on Knowledge and Data Engineering, vol. 5, Iss. 6, Dec. 1993, pp. 950-964.
Shipway and Tricker, "Data Validation and Correction by Context", TDB Sep. 1971, pp. 1132-1137.
Wikipedia, "Apriori Algorithm", [online], Updated May 22, 2006, [retrieved on Jun. 20, 2008], retrieved from the Internet at <URL: http://en.wikipedia.org/w/index.php?title=apriori_algorithm &printible=yes>, 3 pp.
Wikipedia, "Decision Tree", [online], [retrieved on Nov. 1, 2006], retrieved from the Internet at <URL: http://en.wikipedia.org/w/index.php?title=Decision_tree&printable=yes>, 7 pp.
Wikipedia, "N-gram", [online], [retrieved on May 13, 2007]. Retrieved from the Internet at <URL: http://en.wikipedia.org/wiki/N-gram>, 3 pp.
Williams, J., "Tools for Traveling Data", [online], Jun. 1997, [retrieved on Mar. 25, 2008], retrieved from the Internet at <URL: http://www.dbmsmag.com/9706d16.html>, 10 pp.
Notice of Allowance 1, Aug. 29, 2011, for U.S. Appl. No. 11/779,251, filed Jul. 17, 2007 by G. Agrawal et al., Total 18 pp.
Office Action 1, Apr. 5, 2010, for U.S. Appl. No. 11/779,251, filed Jul. 17, 2007 by G. Agrawal et al., Total 29 pp.
Final Office Action 1, Oct. 1, 2010, for U.S. Appl. No. 11/779,251, filed Jul. 17, 2007 by G. Agrawal et al., Total 23 pp.
Amendment 1, Jul. 6, 2010, for U.S. Appl. No. 11/779,251, filed Jul. 17, 2007 by G. Agrawal et al., Total 16 pp.
Amendment 2, Dec. 28, 2010, for U.S. Appl. No. 11/779,251, filed Jul. 17, 2007 by G. Agrawal et al., Total 18 pp.

(56) References Cited

OTHER PUBLICATIONS

Office Action 1, Apr. 14, 2011, for U.S. Appl. No. 11/769,639, filed Jun. 27, 2007 by J.J. Labrie et al., Total 36 pp.

English Abstract for CN1435781A, published Aug. 13, 2003, Total 1 p.

English Abstract for CN1145901C, published Apr. 14, 2004, Total 1 p.

Nesvizhskii, A.I, F.F. Roos, J. Grossmann, M. Vogelzang, J.S. Eddes, W. Gruissem, S. Baginsky, and R. Aebersold, "Dynamic Spectrum Quality Assessment and Iterative Computational Analysis of Shotgun Proteomic Data", Molecular & Cellular Proteomics, vol. 5, © 2006, The American Society for Biochemistry and Molecular Biology, Inc., pp. 652-670.

Janta-Polczynski, M. and E. Roventa, "Fuzzy Measures for Data Quality", 18th International Conference of the North American Fuzzy Information Processing Society, Jul. 1999, pp. 398-402.

Marchetti, C., M. Mecella, M. Scannapieco, and A. Virgillito, "Enabling Data Quality Notification in Cooperative Information Systems through a Web-Service Based Architecture", Proceedings of the Fourth International Conference on Web Information Systems Engineering, 2003, Total 4 pp.

Wang, R.Y., H.B. Kon, and S.E. Madnick, "Data Quality Requirements Analysis and Modeling", Proceedings of the Ninth International Conference on Data Engineering, 1999, pp. 670-677.

Notice of Allowance 2, Apr. 26, 2012, for U.S. Appl. No. 11/779,251, filed Jul. 17, 2007 by G. Agrawal et al., Total 15 pp.

Jingyi, D., "Survey of Association Rule Data Mining", © 1994-2009 China Academic Journal Electronic Publishing House, Total 2 pp. [with English Abstract on p. 1].

Peim, M., E. Franconi, and N.W. Paton, "Estimating the Quality of Answers when Querying over Description Logic Ontologies", Data & Knowledge Engineering, © 2003, Total 25 pp.

Office Action 1, Jun. 3, 2013, for U.S. Appl. No. 13/435,352, filed Mar. 30, 2012 by L. Burda et al., Total 39 pp.

Notice of Appeal, Jan. 28, 2014, for U.S. Appl. No. 12/165,549, filed Jun. 30, 2008 by T. Bittner et al., Total 2 pp.

Pre-Appeal Brief Request for Review, Jan. 28, 2014, for U.S. Appl. No. 12/165,549, filed Jun. 30, 2008 by T. Bittner et al., Total 6 pp.

Office Action 3, Apr. 15, 2014, for U.S. Appl. No. 13/435,352, filed Mar. 30, 2012 by L. Burda et al., Total 19 pp.

Reply Brief, Aug. 5, 2014, for U.S. Appl. No. 12/165,549, filed on Jun. 30, 2008 by T. Bittner et al., Total 6 pp.

Examiner's Answer, Jun. 5, 2014, for U.S. Appl. No. 12/165,549, filed on Jun. 30, 2008 by T. Bittner et al., Total 37 pp.

Response to Office Action 3, Jul. 15, 2014, for U.S. Appl. No. 13/435,352, filed on Mar. 30, 2012 by L. Burda et al., Total 12 pp.

\* cited by examiner

SEMANTIC DISCOVERY AND MAPPING BETWEEN DATA SOURCES

RELATED APPLICATIONS

This application is a divisional of U.S. patent application Ser. No. 13/267,292, filed on Oct. 6, 2011, which is a divisional of U.S. Pat. No. 8,082,243, issued on Dec. 20, 2011, which is a continuation of U.S. Pat. No. 7,426,520, issued on Sep. 16, 2008, which claims the benefit of U.S. Provisional Patent Application 60/502,043 filed Sep. 10, 2003, which non-provisional patent application and provisional patents and patent applications are incorporated herein by reference in their entirety.

TECHNICAL FIELD

The present invention relates to a method and apparatus for automating the way computer systems, applications, files and databases are integrated. Specifically, the present invention relates to the discovery of semantics, relationships and mappings between data in different software applications, databases, files, reports, messages or systems.

DESCRIPTION OF RELATED ART

The Information Technology (IT) professionals have performed data and application integration for many years. A typical integration project has three distinct phases: discovery, integration, and maintenance. Discovery phase involves identifying relationships between the systems that need to be integrated. Integration phase involves creating programs or specifications to perform the physical data movement or interfacing. The maintenance phase involves updating and changing the integration programs to correspond to changes in the systems being integrated or to accommodate new integration requirements.

Several prior art patents describe various conventional ways of integrating data across systems. U.S. Pat. No. 5,675,785—Hall, et al., Oct. 10, 1997, 395/613, "DATA WAREHOUSE WHICH IS ACCESSED BY A USER USING A SCHEMA OF VERTICAL TABLES". This patent describes a system where a layer of logical tables is created and mapped to the physical tables in a data warehouse such that the user specifies queries against the logical tables to access data in the physical tables. It does not address the problem of discovering relationships and mappings between data in different data sources.

U.S. Pat. No. 5,806,066—Golshani et al, Sep. 8, 1998, 707/100, "METHOD OF INTEGRATING SCHEMAS OF DISTRIBUTED HETEROGENEOUS DATABASES". This patent describes a graphical system that allows the user to graphically merge multiple distributed schemas into a global schema. It does not address the use of data to determine the relationship between the two schemas.

U.S. Pat. No. 5,809,297 Kroenke, et al Sep. 15, 1998, 395/613, "SEMANTIC OBJECT MODELING SYSTEM FOR CREATING RELATIONAL DATABASE SCHEMAS". This patent describes how to create a relational schema from a semantic object definition.

U.S. Pat. No. 6,026,392 Kouchi et al. Feb. 15, 2000, 707/200, "DATA RETRIEVAL METHOD AND APPARATUS WITH MULTIPLE SOURCE CAPABILITY". This patent describes a system that moves data from source database to target database with a different structure. However, the '392 patent does not describe creating a new data source based on the structure of an existing data source, or moving data from the existing data source to the new one, or creating reports from the new data source.

U.S. Pat. No. 6,226,649 Bodamer, et al. May 1, 2001, 707/104, "APPARATUS AND METHOD FOR TRANSPARENT ACCESS OF FOREIGN DATABASES IN A HETEROGENEOUS DATABASE SYSTEM". This patent addresses remote access of data from a heterogeneous database. The '649 patent does not address the determination of how that remote data is related to the data in the local database.

U.S. Pat. No. 6,339,775 Zamanian et al. Jan. 15, 2002 707/101, "APPARATUS AND METHOD FOR PERFORMING DATA TRANSFORMATIONS IN DATA WAREHOUSING". This patent describes a system and apparatus that extracts, transforms and loads data from one or more data sources to a data warehouse.

U.S. Pat. No. 6,393,424 Hallman et al, May 21, 2002, 707/10, "METHOD AND APPARATUS FOR USING A STATIC METADATA OBJECT TO REDUCE DATABASE ACCESS". This patent describes a system that retrieves metadata from memory and uses it to retrieve data from the database. This patent applies to a single database access, not a relationship between data in different databases or different data tables in the same database.

US20020178170A1 Britton, et al, Nov. 28, 2002, 707/100, "METHOD AND APPARATUS FOR ENTERPRISE APPLICATION INTEGRATION". This patent addresses heterogeneous data access, not the relationship between heterogeneous data.

WO 01/75679 A1 Scanlon et al. Oct. 11, 2001, G06F 17/30, "A SYSTEM AND METHOD FOR ACCESSING DATA IN DISPARATE INFORMATION SOURCES"

WO 02/073468 A1—Kil, et al., Sep. 19, 2002, G06F 17/30, "AUTOMATIC DATA EXPLORER THAT DETERMINES RELATIONSHIPS BETWEEN ORIGINAL AND DERIVED FIELDS"

The integration phase has been the focus for computer scientists and software vendors for many years. The discovery phase, however, has not been automated and frequently involves a time-consuming manual and cross-functional effort.

SUMMARY OF THE INVENTION

Embodiments of the present invention are directed to data analysis and automatic determination of causal relationships and correlations between various data fields in order to improve the performance of a data analysis process. The discovery of semantics, relationships and mappings between data in different software applications, databases, files, reports, messages, or systems, is described. In one aspect, semantics and relationships and mappings are identified between a first and a second data source. A binding condition is discovered between portions of data in the first and the second data source. The binding condition is used to discover correlations between portions of data in the first and the second data source. The binding condition and the correlations are used to discover a transformation function between portions of data in the first and the second data source.

Other features of the present invention will be apparent from the accompanying drawings and from the detailed description which follows.

DESCRIPTION OF THE DRAWINGS

The present invention is illustrated by way of example and not limitation in the figures of the accompanying drawings, in which:

FIGS. 7A, 7B and 7C illustrate embodiments of a graphical user interface of the present invention.

DETAILED DESCRIPTION

Figure 1:
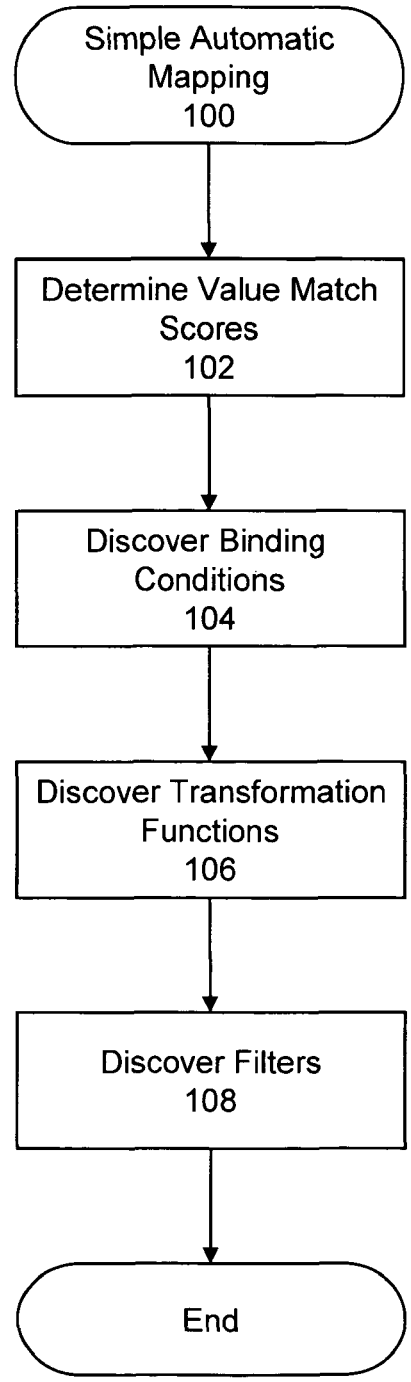
FIG. 1 illustrates a flow chart of an embodiment of a Simple Automatic Mapping process

An apparatus and method is described for the discovery of semantics, relationships and mappings between data in different software applications, databases, files, reports, messages or systems. In the following detailed description, numerous specific details are set forth in order to provide a thorough understanding of the present invention. It will be evident however to one of ordinary skill in the art that the present invention may be practiced without these specific details. In other instances, well known structures and devices are shown in blocked diagram form in order to avoid unnecessarily obscuring the present invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In one embodiment, steps according to the present invention are embodied in machine-executable software instructions, and the present invention is carried out a processing system by a processor executing the instructions, as will be described in greater detail below. In other embodiments, hardwired circuitry may be used in place of, or in combination with, software instructions to implement the present invention.

I. Overview

Embodiments of the present invention automate the discovery of semantics, relationships and mappings between data in disparate software applications, databases, files, reports, messages or systems. The metadata and the data in the systems are analyzed using a set of rules, techniques and statistics to deduce relationships between the systems.

The schema in the disparate system is converted into a normalized relational model. Normalized schemas are converted into data objects—objects with a key and scalar and non-scalar attributes. Metadata and data analysis is used to discover a binding condition that relates the data objects instances across systems. Binding condition is a Boolean expression on attributes of the data objects from one or more source systems and a target system that identifies which instances of the source data objects map to which instances of the target data object. The object instances thus related through the binding condition are said to be bound. Bound object instances are then analyzed to establish attribute correlation. Finally, transformation discovery is applied to correlated attributes (columns) to discover transformation functions. Conversely, attributes are used to establish binding in the first place.

As will be described in more detail below, an embodiment of the present invention includes three main processes that contribute to the automated discovery and mapping system. The first process discovers the binding condition between tables in disparate systems. The second process uses an established binding condition to discover correlations between the columns of the bound tables. The third process uses an established binding condition and correlation to discover transformation functions between correlated columns of bound tables.

For simplicity of description, all processes assume one source table and one target table. However, the processes can be applied to multiple source tables by treating such tables as a single view that represents a join of such source tables. In one embodiment, tables include relational tables or tabular files.

Also for simplicity of description, all processes assume that all source and target tables can be copied in their entirety to a single relational database. More practical implementations involve the use of intelligent sampling that only uses related portions of the source and target tables. Alternatively, federated databases, distributed queries or data Extraction, Transformation and Loading (ETL) tools may also be used to join tables across databases.

A. Assumptions and Observations

In an embodiment of the present invention, the following assumptions and observations apply.

All data in a conventional business enterprise is related one way or another—it is mostly a matter of discovering the relationship.

It is possible to use data to identify relationships between data tables.

Except for several well-understood design patterns (e.g., timestamps, counters, generated keys), accidental correlation between different data sources is highly unlikely in large data sets.

B. Key Concepts

Key concepts relating to embodiments of the present invention are described below.

Data Objects—All the key business entities in the enterprise can be represented as a set of data objects. The relationship between these data objects captures the business rules and workings of an enterprise. Every piece of data in the enterprise belongs to one or more data objects. The data objects are present in every system of the enterprise. They can be persisted in the databases (e.g. Relational Database Management Systems (RDBMS) or files, exchanged as messages (e.g. Extensible Markup Language (XML) messages) and manipulated by the applications. Since all enterprises require history and persistence, all the data objects are persisted (stored) somewhere in the enterprise. Because the data objects represent the enterprise, all the data sources in the enterprise are related to each other through the data objects.

Furthermore, all the systems in the enterprise have to work together irrespective of whether they are integrated through automated means (machine to machine) or through intermediate human processes or both. We know they do because orders get accepted, goods get manufactured, orders get filled, services provided, financial information reported and taxes paid. While there may be gaps in the data chains because of purely manual processes and record keeping—it is uncommon for any sizable enterprise that any major system is not automated—links and business processes between systems can be manual, but the systems themselves are normally computerized.

Data objects can be identified and normalized through key discovery, primary-foreign key dependency discovery and join key discovery.

Data objects are represented as a set of parent-child tables where the child has a foreign key from the parent. Data Object is an acyclical graph (a tree). Data object has one and only one root table. Data object can be represented as an outer join of every parent and every child without any loss of data.

Source Data Objects (SDO)—Source Data Objects are data objects discovered in a single data source.

Universal Data Objects or Global Data Objects (UDO)—Universal Data Objects or Global Data Objects are data objects that are persisted in multiple data sources. UDOs are mapped to one or more SDOs.

Binding—Binding is a way to identify the same instance of a UDO across one or more SDOs. For example, if we have a Customer Universal Data Object and a set of Customer Source Data Objects mapped to the Customer UDO, there is a binding condition for each SDO that identifies the same instance of the data object (i.e., the same physical customer) between that SDO and the Customer UDO.

UDO to SDO binding—Binding is always discovered or specified between a UDO and an SDO.

SDO to SDO binding—Using transitive closure, we can generate a binding condition between two or more SDOs using the binding conditions between each SDO and UDO. Sometimes, there may not be a direct binding condition between two SDOs and additional SDOs linking the original two need to be included. For example, there may be a lookup table in Source1 that links together customer ids in Source2 with customer ids in Source3. A binding condition between Source2 and Source3 will have to include Source1 and the lookup table.

Binding is essentially a join condition—Binding is a federated, full outer join condition—a full outer join between tables in two or more data sources. We assume that a majority of the binding conditions are equijoins between table keys.

Correlation—Correlation is a way to discover binding conditions. Correlation is a way to identify data attributes that represent the same values a different way. For example, one system may represent sales regions as North, South, East and West and another as 1, 2, 3 and 4. However, for the same instance of a data object such as customer, the region in one system would correspond to a region in the other system—e.g., North would correspond to 1, South to 2, etc.

Most of the time, we do not have to know what the transformation function is to detect correlation. Given a scalar, stateless transformation function f that can transform a value V1 in System1 into a value V2 in System2 ($V2=f(V1)$), for the same instance of a data object in System 1 and System 2, if the same value $V1_i$ in system 1 always corresponds the same value of $V2_i$ in System 2, there is a correlation between the two. There are transformation functions that do not produce correlations detectable by value correspondence. These include Aggregate functions.

There may be false correlations. These are usually based on generated keys such as integer counters, timestamps, etc. However, these are typically out of sync and do not detect any other correlations and are therefore not picked as binding conditions.

Because we use statistics and attempt to find the best rather than absolute match, we can work with dirty or incomplete information and do not have to identify all possible binding conditions.

Correlations can be between a single column in one data object and one or more columns in another data object. Because transformation functions are scalar, the target has to be a single column.

We assume that a binding condition will have the highest number of attribute correlations between an SDO and a UDO. Thus, we can look at potential binding conditions and see which one gives us the highest number of correlations.

Value Matching—Value matching is a matching of values in two attributes or columns. Value Matching returns statistics about how many values in one column have matches in another column. In one embodiment, matching is performed by comparison of values. In other embodiments, faster comparison techniques may be used to match values, such as hashing or other compression techniques. For example, in one embodiment, matching is performed by comparing values derived from original values, such as would result from comparing hash values of the original values.

Bound Matching, Transformation Function Discovery—using a binding condition and correlation between a set of source columns and target columns, try to identify the transformation function that converts source column values into the target column value.

C. Approach

In one embodiment, given a data source and a set of universal data objects UDOs, the source is mapped to UDOs, using the following approach:

1. Identify local data objects at the source (SDOs)
1.1. Use key analysis to identify keys
1.2. Use foreign key and join key discovery to identify relationship between tables
1.3. Build trees of tables
1.3.1. Remove cycles
1.4. Convert each tree into a source data object SDO
2. Determine binding conditions between UDOs and SDOs
2.1. Perform Value Matching
2.2. Determine correlations between data sources through data analysis and statistics
2.3. Identify binding condition with the highest correlation
3. Match instances of data objects across data sources using bound matching
3.1. Apply binding condition between a UDO and SDO
3.2. Look at correlated columns
3.3. Apply transformation functions to see if can get target value from source values.
4. Add unmapped SDO attributes to the UDO
4.1 Starting with table ST that is the root of SDO and table UT that is bound to ST
4.1.1 If any attribute of ST is unmapped, add it to UT
4.1.2 If any child table SCT of ST does not have a binding condition with some table UT' in UDO, add table SCT as a child of table UT in UDO.
4.2 Repeat for every child of ST
II. Simple Automatic Mapping
A. Overview The following simplest method, although not practical for large-scale deployments, captures the essence of the approach and illustrates embodiments of the techniques that will be used in more complex approaches.

Given:

a. Two data sources: Source S and Target T with tables: $Ts1 \ldots Tsi$ and $Tt1 \ldots Ttj$ respectively, where each table has columns $Ct1 \ldots Ctn$ where t is the table number (e.g., $CS11 \ldots CS1n$)

b. A set of Value Match Rules (VMR) that can take 2 input tables and determine how many rows in one table match the rows in the other table. The rules can be as simple as equality (that determines if the values in two columns are identical) or very complex. Every VMR returns the following statistics:

i. Number of rows in Target table that had matches, ii. Number of distinct values in Target table that had one or more matches.

iii. Number of distinct values in Target tables that had 1 or more mismatches.

Given the above, the Simple Automatic Mapping method discovers mappings between the columns, tables and data sources. FIG. 1 illustrates an embodiment of a Simple Automatic Mapping process 100. At block 102, the process 100 determines value match scores. At block 104, the process 100 discovers binding conditions by determining correlation scores, i.e. does the same value of S correspond to the same value of T. At block 106, the process 100 discovers transformation functions (i.e. attribute matches) by examining correlated source and target columns. At block 108, the process discovers filters, i.e. horizontal partitions of the table where a given binding condition or mapping is strong.

B. Simple Automatic Mapping Process

The Simple Automatic Mapping process 100 illustrated in FIG. 1 is described below in greater detail. In the following description, we will refer to a UDO as a target and an SDO as a source.

The processing represented by block 102 of FIG. 1 identifies potential binding condition columns. For each target attribute and a set of source attributes, Value Match Scores are determined by applying every VMR to every set of source columns and creating a list of statistics for each VMR. The processing may be represented by the following pseudocode:

1 For each target attribute TAi For each set of source attributes (SA1, . . . , SAn) For every Value Mapping Rule VMRx Apply VMRx(SA1, . . . SAn) If the matching row count>Row Number Match Threshold (e.g., 20%), Store scores in a Value Match Table (VMT).

The columns with entries in the VMT are the potential binding condition predicates.

Figure 2:
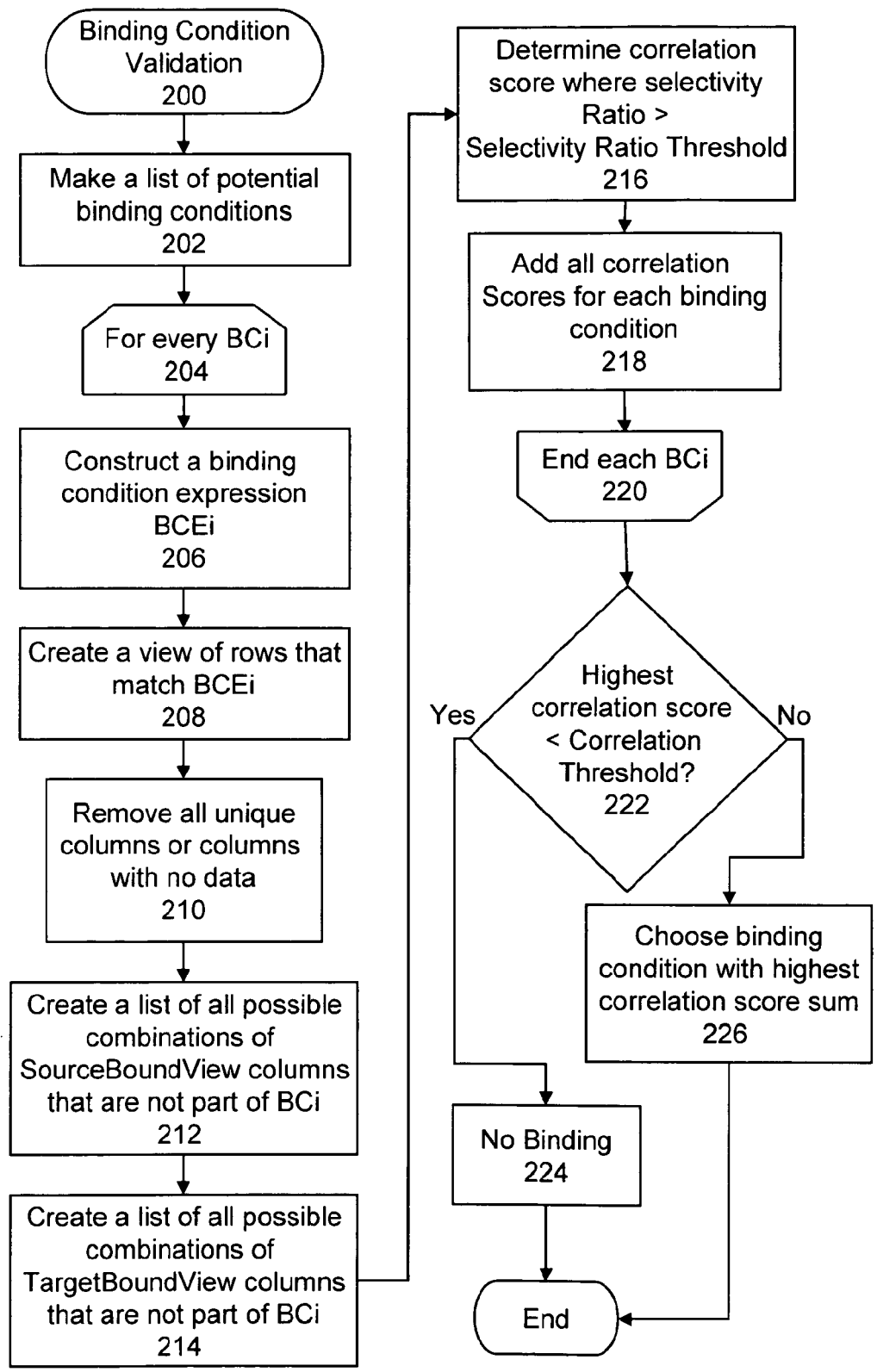
FIG. 2 illustrates a flow chart of an embodiment of a Binding Condition Validation process.

The processing represented by block 104 of FIG. 1 validates Binding Conditions using correlations. FIG. 2 illustrates a flow chart of an embodiment of a Binding Condition Validation process 200, which may be performed at block 104 of FIG. 1. At block 202, the process 200 makes a list of potential binding conditions by creating every permutation of the binding condition predicates in the VMT. For every potential binding condition BCi, processing represented by blocks 206-220 is performed. The processing represented by block 206 constructs a binding condition expression BCEi. For every binding predicate BPj with target attribute TAj, Value Match Rule VMRj and source attributes SAj1 . . . SAjn, a predicate expression of the form TAj=VMRj(Saj1, . . . , SAjN) is created. A conjunction of all the predicates: TA1=VMR1(SA11, . . . , SA1N) and TA2=VMR2-(SA21, . . . , SA2M) and . . . is subsequently created.

The processing represented by block 208 creates a view of the rows that match the binding condition expression. In other words, SourceBoundView=select*from Source where exists (select*from Target where BCi) and TargetBoundView=select*from Target where exists (select * from Source where BCi).

Optionally, in one embodiment, the processing represented by block 210 removes all unique columns or columns with no data (e.g., all NULL). Selectivity=# unique values/# rows—e.g., a unique key will have a selectivity of 1, a gender column-2/# rows. In one embodiment, the processing represented by block 210 filters out the columns with selectivity=0 or selectivity=1, as they will not give meaningful correlation.

At block 212, the process 200 creates a list of all possible combinations of SourceBoundView columns that are not part of the binding condition (Csi+1 . . . CSn): (Csi+1), {Csi+1, Csi+2}, . . . , {Csi+1, . . . , CSn}). At block 214, the process 200 creates a list of all possible combinations of TargetBoundView columns that are not used by the binding condition (e.g., if binding condition is A.X=B.Y, all columns except A.X and B.Y are used).

At block 216, the process 200 determines correlation score between every combination of source and target columns where Selectivity Ratio is >SelectivityRatioThreshold (i.e., selectivity(source columns)/selectivity(target columns)>SelectivityRatioThreshold (e.g., 10)). Correlation score indicates whether the same value of the source combination corresponds to the same value of the target combination. Note that the values do not have to be the same, as long as the same value of source columns (e.g., A) always corresponds to the same value of target columns (e.g., B). Correlation Score=(% target rows where correlation holds)*selectivity of target columns. In one embodiment, determining the correlation can performed according to the following pseudo code:

2 For each source column, for each distinct value (CurrentSourceValue) Create a view ValView as select * from Target where exists (select * from source where BindingCondition and SourceColumn=CurrentSourceValue) For each target column Select count (TargetColumn) from ValView group by TargetColumn Choose the group with highest count, add it to the CorrelationRowCount At this point CorrelationRowCount contains the count of rows that are correlated. % rows where correlation holds=CorrelationRowCount/Target Row Count.

At block 218, the process 200 adds all correlation scores for each binding condition. At decision block 222, the process 200 determines whether the highest correlation score is less than a CorrelationThreshold. In one embodiment, the CorrelationThreshold is about 0.6. If it is determined at block 222 that the highest correlation score<CorrelationThreshold (e.g., 0.6), then at block 224, there is no binding between the tables. Otherwise, the processing represented by block 226 chooses the binding condition with highest correlation score sum. The correlation score sum is determined by summing the highest correlation score for each target column. The Binding Condition with the highest correlation score sum is chosen as the Primary Binding Condition and the remaining binding conditions are saved as Alternative Binding Conditions.

Referring again to FIG. 1, the processing represented by block 106 of FIG. 1 discovers Transformation Functions. For each pair of columns with correlation score>CorrelationThreshold, Transformation Rules (TR) are applied to determine if a transformation function can be deduced. All TRs with value match score>TransformationMatchThreshold as alternate mappings and the TR with highest value match score as the primary mapping. In one embodiment, the TransformationMatchThreshold is about 80%.

The processing represented by block 108 of FIG. 1 discovers filters. Very accurate mappings may be obtained if the data set is restricted. Given a binding condition and a TR, the processing represented by block 108 goes through every source column and identifies all columns where if a column C has a set of unique values V1 . . . Vn, some of the values V1 . . . Vi only occur in rows that match the binding condition and the mapping and other values Vi+1 . . . Vn only occur in rows that do not match the binding condition. In one embodiment, the matching requirement may be relaxed, such that percentage of filter mismatches<FilterThreshold (e.g., 90%), to account for dirty data.

In one embodiment, the processing represented by block 108 generates a filter condition from the value list as follows:

Set VmaxMatch to the maximum value among the matching values for column C.

If VmaxMatch=max(V1, ..., Vi) is less than the minimum value among the non-matching values VminMismatch=min (Vi+1, Vn), generate the filter of the form C<VminMismatch Else if VminMatch>VmaxMismatch, generate filter of the form C>VmaxMismatch Else if all matching rows have value V and non-matching rows have values !=V, generate a filter of the form C=V Else if all non-matching rows have value V and all matching rows have values !=V, generate a filter of the form C !=V Else if there is a small number of values that match the condition, generate a filter condition of the form C in (V1, ..., Vn)

Else, if there is a small number of values that do not match the condition, generate a filter condition of the form C not in (Vi+1, ..., Vn)

If the processing represented by block 108 discovers a filter for a table, a view on the source table is created as "select*from Source where not(FilterCondition)" and process as a separate table.

III. Complete Mapping Discovery

Complete Mapping Discovery is more elaborate than the Simple Automatic Mapping process, and may be used to improve performance. Instead of performing a match between every pair of attributes, Complete Mapping Discovery identifies the attributes with the highest possibility of matching and then applies the match rules.

A. Overview

Figure 3:
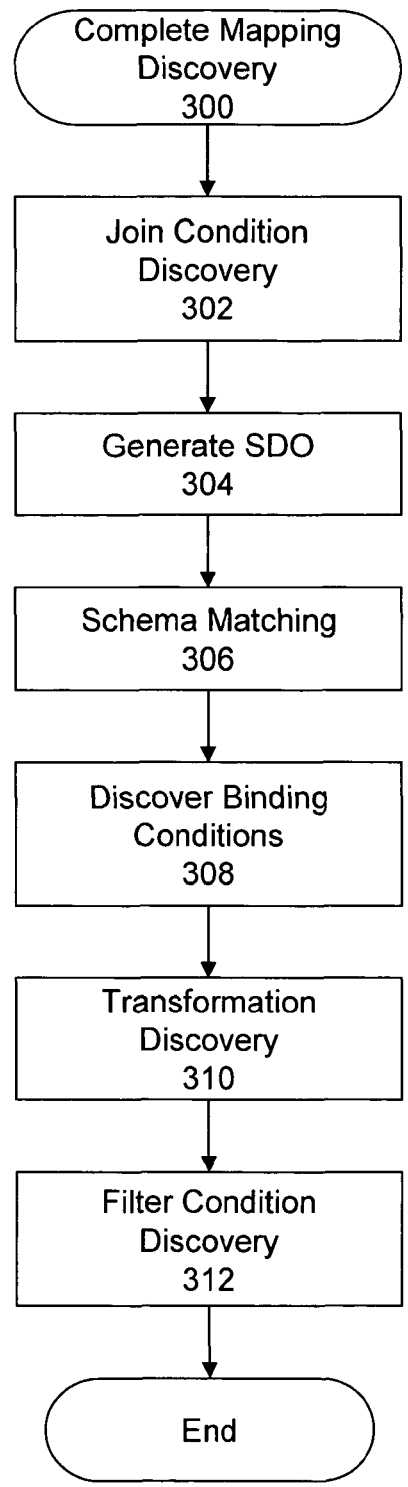
FIG. 3 illustrates a flow chart of an embodiment of a Complete Mapping Discovery process.

FIG. 3 illustrates an embodiment of a Complete Mapping Discovery process 300. The processing represented by block 302 performs Join Condition Discovery to discover which tables are related and how they are related. Initially, all keys are identified in each table. This helps to identify natural keys as well as generated primary keys. Subsequently, inclusion dependencies are also identified. For example, if table C has a foreign key (columns F1 ... Fn) from P and any Fi is part of any key of C dicovered in the previous step, there is an inclusion dependency between C and P where P is the parent and C is the child.

The processing represented by block 304 generates Source Data Objects (SDOs) using join conditions. The process 300 builds an SDO tree. An SDO tree is a tree of tables joined by parent-child relationships discovered by the processing at block 302. In one embodiment, an SDO view as a full outer-join of all parents and children in the tree is also built by the processing represented by block 304. At block 306, the process 300 performs a Schema Matching process between source and target data objects to identify attributes with high potential of matching.

At block 308, the process 300 discovers binding conditions. The process 300 identifies tables that have potential matches and performs correlation analysis to identify groups of columns that have a high degree of correlation.

At block 310, the process 300 performs Transformation Discovery on attributes with high degree of correlation. At block 312, the process performs Filter Condition Discovery on Binding Condition and attributes with a high degree of correlation. In one embodiment, the processing represented by block 312 is the same as that represented by block 108, described above with respect to the Simple Automatic Mapping illustrated in FIG. 1.

B. Complete Mapping Discovery Process

The Complete Mapping Discovery process 300 illustrated in FIG. 3 is described below in greater detail.

1. Join Condition Discovery

Join Condition Discovery (JCD), performed at block 302, discovers which tables are related and how they are related. The first step in JCD is to identify all the keys in each table. The keys may be declared as primary keys, may be defined as unique indices or may have to be discovered by examining the data for column sets that would constitute a unique index. To illustrate an example of one embodiment, the Northwind sample database that is included with Microsoft® Access and Microsoft SQL Server™, available from Microsoft Corporation, Redmond, Wash., is used to illustrate the processes.

a. Key Discovery

In one embodiment, the JCD discovers unique keys by a Key Discovery process as follows:

If a table has a primary key consisting of columns P1, ..., Pn, the Key Discovery process add it to the unique key set K, K={(P1, ..., Pn)} Northwind. Suppliers. SupplierId If there is a unique index for a table on columns I1, ..., Im, the Key Discovery process adds the columns of the index to K as a key: K={(P1, ..., Pn), ..., Im)}

The Key Discovery process checks selectivity of every column. If the relation has R rows and a column Cn has V unique values, it's selectivity will be S=V/R. If selectivity is 1, then the column is unique—add it to K: K={(P1, ..., Pn), ..., Im), (Cn)}Northwind.Suppliers.CompanyName, ContactName, Address, PostalCode, Telephone The Key Discovery process checks cardinality of all columns (C1, ..., CnotInKCount) not in K already. Determine cardinality=select count distinct(C1. vertline . . . vertline. CnotInKCount) from T. If cardinality (the count of distinct values of all column not in K)<R, there are no more unique keys in T. If cardinality is R, determine all minimal subsets that are unique as follows:

Given a set of columns C1, ..., Cn with cardinality R, check cardinality of subsets (C1, ..., Cn−1); (C1, C3, ..., Cn), (C1, C2, C4, ..., Cn) and so on.

If the cardinality of all subsets is less than R, then C1, ..., Cn is the minimal subset—add it to K.

Otherwise, repeat this exercise for each subset with cardinality of R.

The cardinality of Northwind.Suppliers is 29. Cardinality (Suppliers.ContactTitle, Region, Country, Fax, HomePage)= 29, but selectivity of any subset of the columns<29. Therefore, there is a unique key consisting of ContactTitle, Region, Country, Fax, HomePage.

b. Foreign Key Discovery

In one embodiment, JCD discovers foreign keys through data source metadata and through data-driven discovery. Foreign key discovery is performed by a Foreign Key Discovery process as follows.

The Foreign Key Discovery process performs a value match between every key column discovered in Key Discovery step of every table. If the hit percentage (# rows that match/# rows in a table) is >ForeignKeyThreshold for either table, then we say there is a potential foreign key dependency between the two systems on this column. In one embodiment, the ForeignKeyThreshold is about 90%.

The Foreign Key Discovery process then matches a full key from one table to a full or partial key in the other table. Partial keys are not matched to another partial key (e.g., Zip code in Customer will have a high match rate with Zip code in Suppliers), since neither is a key in itself and the match is meaningless unless a full key from either relation can be matched. For each key in Table 1, if every column in the key has a corresponding potential foreign key in Table 2, correlation analysis is performed to make sure that the columns in the same row in Table 1, match the columns in the same row in Table 2. In one embodiment, if the correlation score is lower than about 80% of the smallest match score for individual columns, it is assumed that this is a false foreign key. After correlation analysis, there may still be multiple keys remaining. Correlation analysis is performed across different keys. If there is a match (e.g. >80% of minimum correlation), the keys are combined into a single foreign key. Otherwise, they are left as separate potential foreign keys.

Subsequently, the Foreign Key Discovery process determines which table is primary and which is foreign. If there is a primary-foreign key relationship between a full key of P, but only a partial key of C, then P is the parent and C is the child and the primary-foreign key relationship between them is said to be identifying. If the match columns include a full key of P and a full key of C, then P and C are peers and the relationship is said to be a partition relationship. Note that because multiple join keys may be discovered, the same two tables may have multiple instances of each type of relationships: Table 1 as parent, Table 2 as child; Table 2 as parent and Table 1 as child; and Table 1 and Table 2 as peers. Each relationship will have a different join key.

c. Inclusion Dependency Discovery

Inclusion dependencies are identified by JCD. If table C has a foreign key (columns F1 . . . Fn) from P and any Fi is part of any key of C discovered in previous step, there is an inclusion dependency between C and P where P is the parent and C is the child.

d. False Join Condition Discovery

Key discovery helps identify unique keys for each table. Inclusion discovery identifies foreign keys that are parts of a key for a table. There are many false foreign keys (e.g., custNum may go from 1 . . . N and productNum may go from 1 . . . M. A table T may have a column Num that goes from 1 . . . L where L<N and L<M). This ambiguity may be resolved using metadata matching. However, in the worst case, an inclusion dependency will be created between Cust and T on CustNum=Num and between Product and T on ProductNum=Num. These false dependencies are unlikely to yield any correlations and are mostly performance issues.

2. Source Data Object Construction

Once the parent-child relationships are identified, the processing represented by block 304 constructs source data objects as follows.

From a list of tables in the data source, the following relationships exist for each table:

Parent List—a list of tables that have an identifying foreign key in this table

Peer List—a list of tables that have a partition relationship with this table

Child List—a list of tables that have an identifying foreign key that corresponds to a primary key in this table.

The peers are joined by first creating a view by doing a full outer join of all peer tables on their shared primary key. The view's parent and child lists are concatenations of the peer's parent and child lists. The peers are then removed from the table list, and the combined view is added to the table list. Subsequently, the processing represented by block 304 remove cycles. All tables that do not have any children or any parents are marked as "Clear". All other tables are marked as "Potential Cycles." The tables with Potential Cycles are ordered by the number of parents. The ordering starts with the tables having the least number of parents. For each table with Potential Cycles starting table S, the child links are followed and the cycles resolved using the Cycle Resolution Process, described below.

Source Data Objects (SDOs) are created by making each table that does not have any identifying foreign keys a source data object—it will be the "root" of the SDO. For each SDO, all the descendants of the root are added (children, children's children, etc.) If there are any cycles, the cycles are broken by creating two separate views on a table causing a cycle.

Each SDO can be "unfolded" into a single table by performing an outer join between every parent and its children. Subsequently, matching may be performed on the resulting flat table. In an alternate embodiment, the tables can be further subdivided into second or even third normal forms to perform matching on smaller relations.

a. Cycle Resolution Process

In one embodiment, a Cycle Resolution Process is performed according to the following process. Given a starting table S, a current table T and a list of processed tables P, for each table C in T's child list:

If C is marked as Clear—stop.

If C is the original starting table (S)—a cycle exists, and it is resolved by creating another instance of S—a table S'. Replace S with S' in T's child list. Remove T from the parent list of S and add it to S' parent list.

If C is already in P stop—this cycle is not addressed here, it will be addressed when C or T is processed.

Otherwise, add C to P, call Cycle Resolution Process with T=C At the end of the process, mark S as Clean.

b. Manually Adjusting Source Data Objects

In one embodiment, a user can create new data objects or add tables to existing source data objects using a graphical user interface. In order to create a source data object, the user needs to specify a Data Object Name and a Root Table. In order to add a table to an existing Source Data Object, the user needs to specify the table being added, the parent for the table being added, and a Join Condition to join the table with its parent. Embodiments of a graphical user interface are described below with respect to FIGS. 7-9.

c. Universal Data Object Construction

Universal Data Objects span one or more data sources. Universal Data Objects are created using the Mapping Studio or by auto-mapping them to the Source Data Objects. Universal Data Object is a table tree similar to the Source Data Object, except it includes mappings for each table and each attribute to any number of Source Data Objects for any number of Data Sources.

i. Universal Data Object Definition

Universal Data Object (UDO) is a common data object representing different Source Data Objects in a single integrated structure. The data model of the UDO is a tree of tables related to each other through identifying reference relationship. A data object has the following properties:

Table Tree where each parent table has zero or more child tables. There is a unique join condition to join each parent and child table pair—typically an identifying primary-foreign key condition.

Mapped Source Data Objects—the local data objects from different data sources that have been mapped to this data object. For each, there will be Mapping for each table in the SDO including:

Binding condition

Attribute mappings

In addition, the following terms are used to describe a data object:

Root table is the root of the Table Tree. Root table does not have any parents

Nested Table—is any table in the Table Tree that is not a root table.

Leaf Table—a table in the Table Tree that does not have any children

Primary key—the primary key of the root table

Full. Extended table—a left outer join of all the tables in a table tree achieved by starting with the root table and performing a left outer-join on all the child tables and then their child tables, etc. such that the parent is always the left table and the child is the right table. Note that some embodiments may use different joins such as an inner-join or a full outer-join.

Full Extended primary key—a combined key of every table in the data object

Attribute—a column of any table in a data object Root attribute—a column of the root table Nested attribute—a column of one of the nested tables Extended table—a left-outer join of a branch leading to the child table that includes primary keys of the ancestors and the rows in the child table. Note that some embodiments may use different joins such as an inner-join or a full outer-join. For example, if the data object consists of a Root table R with
Primary key column Pr
Children T1 and T2
T2 with
Primary key P2
Foreign key Pr
Join condition with R of R.Pr=T2.Pr
Child T21
T21 with
Primary key P21
Foreign key P2
Join condition T2.P2=T21.P2
Columns C1, . . . , Ci, The extended T21 table would be generated as: select R.Pr, T2.P2, T21.P21, T21.C1, . . . , T21.Ci from R, T2, T21 where R.Pr*=T2.Pr and T2.P2*=T21.P2

Extended table key—a combined key of all ancestors of a table and the table. In the previous example, the extended table key would be Pr, P2, P21.

3. Mapping Discovery

Mapping Discovery involves the following processes: Schema mapping, Binding Discovery, Correlation Discovery, and Transform Function Discovery.

a. Schema Mapping

Data mapping is expensive. In one embodiment, in order to focus mapping on relevant columns, the processing represented by block 306 of FIG. 3 attempts to identify high probability correlated attributes using schema mapping. Schema mapping relies on several techniques:

Metadata index—a collection of words and synonyms used in table and column names and descriptions.

Type compatibility matrix.

Exception list—a collection of words that may not provide meaningful correlation. These include:

Frequently used names: names that do not present a high confidence correlation without an additional qualifier (e.g., "name", "id", "number")

Description Ignore List: words that do not provide semantic content (e.g., "the", "a" "in", "on" "for").

i. Metadata Index

In one embodiment, a metadata index is the main schema-mapping tool. It is essentially a hash table of all the words encountered either as table names, column names or descriptions. Each entry in the table contains:

A list of UDO attributes that it corresponds to and has a different relevance score for each attribute.

A list of synonyms (pointers to their index entries) that were either pre-loaded or discovered. For each synonym, there is a synonym relevance score that reflects how closely the synonym matches a given word (e.g., "Number" and "Num" may have a relevance score of 0.9, but "Number" and "Code" of 0.6)

Table 1, below, illustrates an embodiment of a metadata index:

3TABLE 1 Entry Attributes (Score) Synonyms (Score) Num CustomerUDO.CustomerId (0.4) Number (0.9), Id (0.5), Count (0.8), Code (0.6), Nr (0.8), Identifier (0.5) Customer CustomerUDO.CustomerId (0.5), Client (0.9), Cust (0.9), CustomerUDO.CustomerAddress KUN (0.8) (0.4)

ii. Metadata Index Construction

Initially, the index is preloaded with a set of common term synonyms (e.g., "Num", "Number", "Id", "Identifier", "Code", etc.). These entries are linked together with appropriate relevance scores and do not have any UDO attributes. In one embodiment, every time mapping is performed on data objects, the index gets populated as follows (Note, the coefficients, scores and multipliers are provided as examples. Different embodiments may use different coefficients, multipliers and scores): For each new attribute added to a UDO, add UDO attribute name to the index Add column name to the index If the name is a frequently used name from the exception list (e.g., id), assign it relevance score of 0.5

If the name is not a frequently used name, split it into words using delimiters. e.g., "Customer Name" gets split into "Customer", "Name".

Each word gets added to the index with a score of 1# words—e.g., 0.5 and 0.5. Supported delimiters include ' ', '–', '_' and caps (e.g., CustomerName)

Break column description into words.

Remove the words in the Description Ignore List from the list.

For each remaining word, add to the Metadata index with a relevance=0.8/# words.

Add UDO object name to the index with relevance of 0.2/# words.

Add UDO object description to the index with relevance of 0.2/# words in the description.

If match an existing UDO attribute to an SDO attribute, set the multiplier to 1 and update the index.

Given a multiplier, update the index as follows. Only add entries to the index whose final relevance score >0.1).

Add SDO column name to the index with the relevance score of multiplier/# words

Add SDO column description to the index with the relevance score of 0.8*multiplier/# words Add SDO table name to the index with the relevance score of 0.2*multiplier/# words Add SDO table description to the index with the relevance score of 0.2*multiplier/# words If there are any foreign keys, add them as columns to the metadata index (repeat step 2) with a multiplier of 0.8 if identified through metadata or 0.6 if discovered.

If there is a user defined datatype for the column, add it to the index with relevance of 0.5*multiplier/# words iii. Schema Mapping Rules In one embodiment, the following rules are included:

Word match rule

Type conversion rule

String Containment Rule—checks if string1 is contained in string2

String Overlap Rule—checks if string1 and string2 have a common substring

In one embodiment, users will be able to develop arbitrarily complex custom rules.

iv. Schema Matching Process

In one embodiment, a schema matching process using word match and type conversion rules is performed as follows:

Start with an empty Table Relevance List RT

For each source table.

Set relevance to 0.2

Apply Word Match Rule to table name—get back a list of relevant attributes with relevancy score for each—add them to RT Apply Word Match Rule to table description—add resulting attributes to RT For each source column start with an empty Relevant Attribute List RA Copy RT (Table relevance list) to the Relevant Attribute List RA Apply Word Match Rule to column name Set Relevance to 1

Add the results to RA

If the column has a user defined datatype, apply Word Match Rule to the datatype with relevance of 0.5

Apply Word Match Rule to column description with relevance of 0.8

Each column now has a Relevant Attribute List RA

Sort list by relevance

Remove duplicate entries—if an Attribute is in the list more than once, keep the entry with highest relevance score For each relevant attribute in RA, perform type match using type matching rule If the type matching rule determines that the source column and the attribute in RA can be converted into each other without any loss of data or are identical, keep the score for the attribute as is If the types can only be converted into each other with potential loss of data, multiply the relevance score by 0.8

If the types cannot be converted into each other, remove the attribute from the list Create a target oriented relevance list TRL such that every target attribute mentioned in RL, gets it own list of relevant source attributes For each column SC that has a relevant attribute list RA For each target attribute TC in RA Add SC to TC's TRL with the relevance score in RA.

b. Binding Condition Discovery

Once a Relevance list is created, the processing represented by block 308 of FIG. 3 discovers a binding condition between the UDO and an SDO. To simplify the description, this section describes an embodiment of the discovery of the binding condition between a source table and a target table. The described embodiment can be easily extended to the tables of a UDO and SDO or can be applied to any part of SDO or UDO sub-tree by flattening that sub-tree using an outer join technique described above.

A binding condition is a Boolean expression between the columns of the source table and the column of the target table that exclusively matches a row or a set of rows in the source table with a row or a set of rows in the target table. For example, given a source table S and a target table T, binding condition S.customerid=T.clientnum will match a row that represents company XYZ as a customer in S with a corresponding row that represents company XYZ as a customer in T. We refer to these corresponding rows of Source and Target tables as being bound.

Note that the match has to be exclusive—in other words, a row SR that represents company XYZ in the source can only match rows in the target TR that represent company XYZ and TR can only match SR. The binding condition does not have to be one row to one row. It can be one row to many rows, many rows to one row or many rows to many rows as long as every row in the source row set SRS is exclusively bound to the rows in the target row set TRS and every row in TRS is exclusively bound to the rows in SRS.

Multiple binding conditions are possible between the same tables (e.g., S. custname=Tclientname may be a binding condition as can S.customerid=T.clientnum). Percentage of bound rows helps identify the best binding condition. However, multiple binding conditions are possible. In fact, sometimes it is possible to get "false" binding conditions. For example, a customer id can be assigned independently as an integer in two disparate systems such that customer id 99 on one system is for customer X, while 99 on another system is for customer Y. A binding condition relating customer ids across these systems would be a false binding condition.

In order to identify false binding conditions, a correlation discovery process is used to identify correlations across systems. False binding conditions are unlikely to have any correlations, while true binding conditions will have multiple correlations. Thus the higher the number of correlation and the stronger those correlations are, the stronger is the binding condition.

Binding conditions are usually based on equality as illustrated in the following process. However, they can be any Boolean expression that can be applied to source and target tables to identify rows that are uniquely bound to each other.

i. Equality Based Binding Condition Discovery (EBCD1) Process

In one embodiment, the processing represented by block 308 of FIG. 3 performs an Equality Based Binding Condition Discovery (EBCD1) Process. The goal of the EBCD1 is that given a source table S and target table T, discover Boolean expression B that exclusively binds rows of S to rows of T.

Because of dirty data or domain mismatch (e.g., source has data for NY, while target for all of the United States), the binding may not be perfect. The following thresholds may be used to help identify meaningful matches:

Overlap Threshold—% of rows that must be matches for a source/target column pair to be considered a potential binding condition. In one embodiment, the Overlap threshold is about 80%.

Combination Threshold—% of rows where two predicates occur together to be considered a combination.

Figure 4:
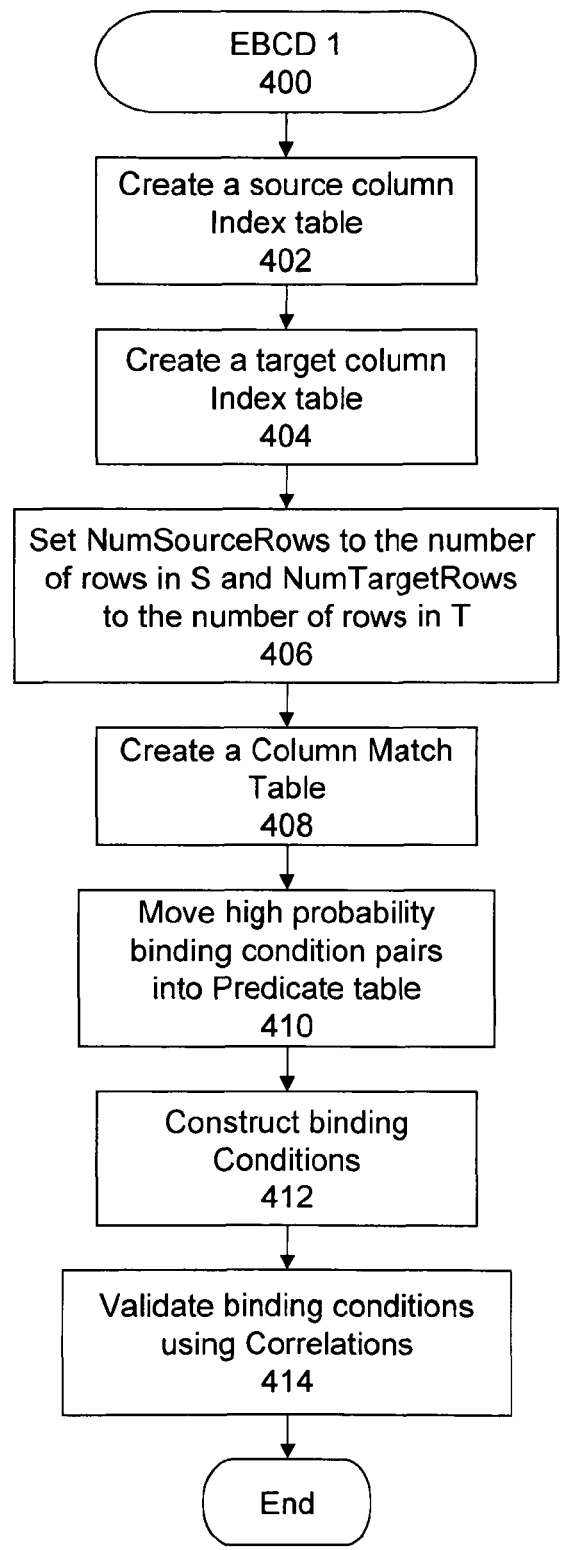
FIG. 4 illustrates a flow chart of an embodiment of an Equality Based Binding Condition Discovery process.

An embodiment of the EBCD1 process 400 is described below with respect to FIG. 4. At block 402, the process 400 creates a source column index table SCIT of all values in S. Each row of the column index table will contain a value Value, a column number ColNum and a count of how many times the value occurred in that column RowCount.

At block 404, the process 400 creates a target column index table TCIT of all values in T. Each row of the column index table will contain a value, a column number and a count of how many times the value occurred in that column.

At block 406, the process 400 sets NumSourceRows to the number of rows in S and NumTargetRows to the number of rows in T.

At block 408, the process 400 creates a Column Match Table CMT with columns:

SourceCol—the column number of the source column, TargetCol—the column number of the target column, SourceHits—number of source rows that match, TargetHits—number of target rows that match, according to the following process:

For each unique row Srow in SCIT (a unique source column number, value combination)

For each unique row Trow in TCIT (a unique target column number, value combination)

If Srow.Value=Trow.Value, add Srow.RowCount to CMT[SourceCol][TargetCol].SourceHits and Trow.RowCount to CMT[SourceCol][TargetCol].TargetHits At block 410, the process 400 moves high probability binding condition pairs into Predicate table with columns SourceCol and TargetCol, according to the following process:
   For each Source column S
   For each target column T
      If CMT[S][T].SourceHits>numSourceRows*MatchThreshold and CMT[S][T].TargetHits>numTargetRows*MatchThreshold, add S and T to the Predicate Table, setting SourceCol to S and TargetCol to T. In one embodiment, MatchThreshold is 80%.
   Assign a unique number to each predicate (e.g., PredicateNum)
   Store Predicates table in a relational database.

At block 412, the process 400 constructs binding conditions. At this point, there is a set of potential predicates. Some of these may be legitimate and some may be false binding conditions. We would like to identify combinations of predicates that generate more powerful binding conditions than individual predicates. The processing represented by block 412 of FIG. 4 is described in greater detail below with respect to FIG. 5.

Figure 5:
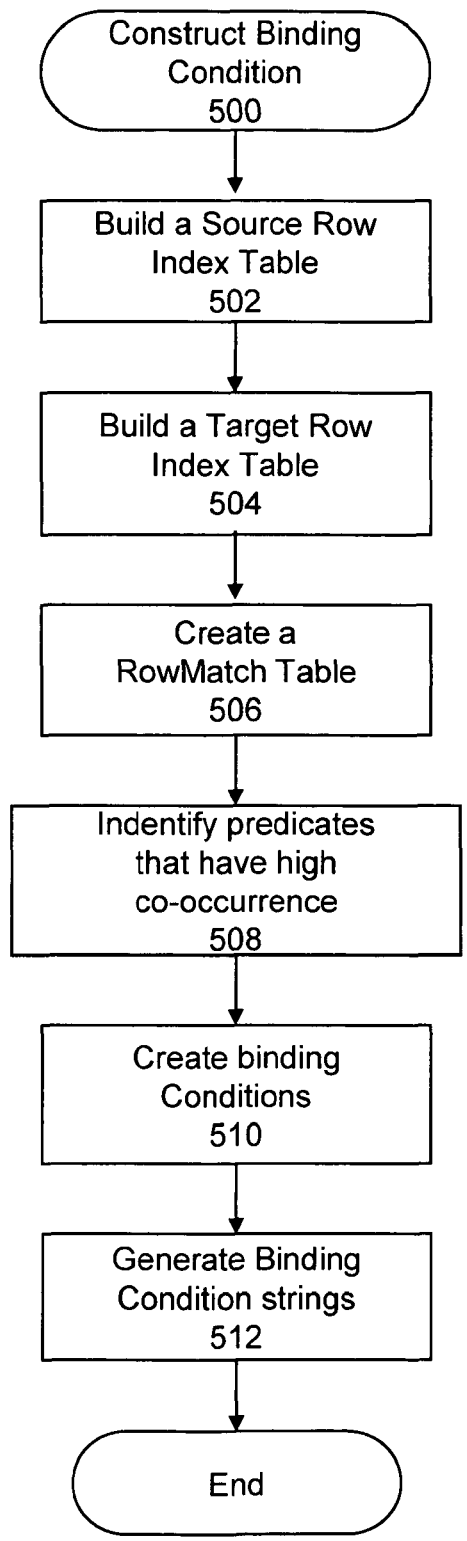
FIG. 5 illustrates a flow chart of an embodiment of a Construct Binding Condition process.

Referring to FIG. 5, at block 502, the Construct Binding Condition process 500 builds a Source Row Index Table (SRIT) with columns Value, ColNum and RowNum, according to the following process:
   Make a list of all source columns in Predicates Table: PredSourceCol1 .... PredSourceColN
   Select values for those columns (select PredSourceCol1, ..., PredSourceColN from S)
   For each row R
   For each column C
   Add a row to SRIT where Value=the value of C, ColNum=the column number of C and RowNum=row number of R
   Store SRIT in a relational database.

At block 504, the process 500 builds a Target Row Index Table (TRIT) with columns Value, ColNum and RowNum, according to the following process:
   Make a list of all Target columns in Predicates Table: PredTargetCol1 .... PredTargetColN
   Select values for those columns (select PredTargetCol1, ...,
   PredTargetColN from S)
   For each row R
   For each column C
   Add a row to TRIT where Value=the value of C, ColNum=the column number of C and RowNum=row number of R
   Store TRIT in a relational database.

At block 506, the process 500 creates a RowMatchTable (or view) that identifies which predicates occur on which rows. The process 500 executes the following query against a database containing SRIT, TRIT and Predicates tables:
   Select Predicates.PredNum, SRIT.RowNum as SourceRow, TRIT.RowNum as TargetRow from Predicates, SRIT, TRIT where Predicates.SourceCol=SRIT.ColNum and Predicates.TargetCol=TRIT.ColNum and SRIT.RowNum=SRIT.RowNum The process 500 subsequently stores the resulting rows in RowMatchTable(PredicateNum, SourceRow, TargetRow)

At block 508, the process 500 identifies predicates that have high co-occurrence—for each predicate combination, the process 500 counts how many times predicates occur in the same row, according to the following process:
   Issue the following SQL query: select RMT1.PredicateNum as Pred1, RMT2.PredicateNum as Pred2, count (*) as RowCount from RowMatchTable RMT1, RowMatchTable RMT2 where RMT1.SourceRow=RMT2.SourceRow and RMT1.TargetRow=RMT2.TargetRow group by RMT1.PredicateNum, RMT2.PredicateNum
   Load the rows where RowCount>NumRows*CombinationThreshold into Predicate Combinations Table PCT
   Eliminate duplicates from PCT by deleting all rows where Pred1>Pred2

At block 510, the process 500 creates binding conditions by combining predicates with high co-occurrence, according to the following process:
   Read rows from PCT ordered by Pred1. For each new value P1 of Pred1
   Add P1 to PredicateList
   For every row R with Pred1=P1, get P2=value of Pred2
   Add P2 to PredicateList
   Generate every combination of Predicates in PredicateList (e.g., if PredicateList contains predicates 3, 5, and 11, generate ({3}, {5}, {11}, {3, 5}, {3, 11}, {5, 11} and {3, 5, 11})
   Add each unique new combinations to the BindingConditionsList (i.e., do not add duplicates)

At block 512, the process 500 generates Binding Condition strings according to the following process:
   For every combination C of predicates in BindingConditionsList For each predicate P in C
   Set SourceColName to the source column name for that predicate
   Set TargetColName to the target column name for that predicate
   Generate a predicate string of the form "<SourceColName>=<-TargetColName>"
   Add predicate to the BindingConditionString
   If BindingConditionString is empty, BindingConditionString=Predicat-eString
   If BindingConditionString is not empty, BindingConditionString="<-; BindingConditionString> and <PredicateString>"
   Add BindingConditionString to the list of binding conditions for S and T.

Referring again to FIG. 4, at block 414, the process 400 validates Binding Conditions using Correlations. For each Binding Condition, the process 400 performs a Correlation Discovery Process (CD1), described below. If CD1 does not return any correlations, the process 400 removes Binding Condition from the Binding Condition List. Otherwise, for each Correlation C discovered by CD1, the process 400 sets BindingConditionWeight=BindingConditionWeight+CorrelationWeight for C, and orders binding conditions in BindingConditionWeight order (i.e., the one with the most correlations wins).

ii. Correlation Discovery

The Correlation Discovery process (CD1) discovers correlation between Source and Target columns of bound tables. A set of source columns is said to be correlated to a set of target columns, if in every row of a source table, the value of a the source columns always corresponds to the same value of the target columns in a bound row of the target table. For example, Source.Region is correlated to Target.District if for every row of Source where Region='R1', in the bound row of the Target, District="East". Since data may be dirty or out of sync, we do not expect the correlation to hold 100% and use a threshold to determine whether to accept a partial correlation.

Another way to describe this is if we join Source and Target on the binding condition, there will be a functional dependency between the correlated source and target columns. Note that it is not necessary to know how to transform the source columns into target columns, just that they correspond.

A transformation is a correlation where it is actually know how to generate the target column value from the bound source column values. For example, if Target.AreaCode=substring(Source.Phone, 1, 3) (first three characters of the Source.Phone field), there is a correlation between Target.AreaCode and Source.Phone and the transformation function is substring(Source.Phone, 1, 3). While a transformation is strictly a subset of correlation, in the rest of this description, correlations where the transformation function is not known are referred to as correlations and the correlations where the transformation function is known are referred to as transformations.

aa. Correlation Discovery (CD1) Process

The goal of the CD1 process is that given source table S, target table T and Binding condition B, discover all correlations between columns in S and columns in T. In one exemplary embodiment, the CD1 process obtains a correlation count for each Source column/Target column combination, eliminates unique columns, and creates correlations for each Source column/Target column combination where the correlation count is greater than a threshold.

In one embodiment, to help with the process, the following arrays and variables are used:

Int CorrelationCount[num source columns][num target columns]—keeps correlation counters for each {S.Ci, T.Cx} combination as CorrelationCount[i][x]

Int NonUniqueRowCount [num source columns]—keeps track of number of rows that contain non-unique values for that column for each source column Int TotalRowCount—contains the number of bound row combinations.

In one embodiment, the following thresholds are also used:

UniqueColumnThreshold—% of non-unique rows that gives meaningful correlation. In one embodiment, the UniqueColumnThreshold is about 80%.

CorrelationThreshold—% of correlated rows that gives a meaningful correlation. In one embodiment, the CorrelationThreshold is about 80%.

For each source column S.Ci, target column T.Cx combination, the CD1 process summarizes the maximum count of a distinct value of how many times a value of TCx occurs for each value of S.Ci. For example, if S.Ci=5 occurs in 5 rows. In 3 of these rows T.Cx='abc' and in 2 rows—'xyz'; the max count of any value is 3 (for value 'abc'), so the CD1 process adds 3 to the count of correlated rows between S.Ci and T.Cx.

In one embodiment, the process works as follows: for each source column S.Ci, the CD1 process issues the following SQL query:

Select S.Ci, T. C1, . . . , T.Cz from S, T where B order by Ci

The query will return a stream of values ordered by a value of S.Ci. The CD1 process then performs the following process:

For each row, increment TotalRowCount
For each unique value of S.Ci
If there is only 1 row for S.Ci—skip—go to the next value of S.Ci
If there are multiple rows
Increment NonUniqueRowCount[i] by number of rows
For each target column T.Cx
For each unique value U in T.Cx,
Set RowCount=count of how many times it occurs for the same value of S.Ci
Add RowCount to a list of row counts RowCountsList
Set MaxCount=Select the largest row count from RowCountsList
Add MaxCount to CorrelationCount[i] [x]
Next, for each source column S.Ci, the CD1 process performs the following:
Eliminate unique source columns
If Non UniqueRowCount[i] <TotalRowCount*UniqueColumnThreshold, skip this column
For each target column T.Cx
If CorrelationCount[1][X] >TotalRowCount*CorrelationThreshold, create a correlation between S.Ci and T.Cx with CorrelationWeight of TotalRowCount/CorrelationCount[I][X].

c. Transformation Discovery

The processing represented at block 310 of FIG. 3 performs Transformation Discovery. The goal of Transformation Discovery is that given a binding condition (BINDING_CONDITION) and correlation between one or more source columns and a target column, discover the transformation function to generate the target column value from the source column values.

In one embodiment, different approaches can be applied for different types of columns. For example:

Numeric columns
Determine ratio
Determine difference
Convert to strings and apply string processes
Date, Time and Datetime columns
Determine interval (difference)
String columns
Apply PTD1 (described below) process to discover Positional Transformations
Apply TTD1 process to discover Token Transformations
If numeric, convert to a number and apply numeric tests
If a date, time or datetime, convert to date and apply date processes ii. Positional Transformation Discovery Process 1 (PTD1)

To execute the Positional Transformation Discovery 1 (PTD1) process, the following arrays, variables and structures are used:

Int CharsetLen—number of characters in the character set. A charset mapping table may be used to only represent meaningful (e.g., printable) characters thereby minimizing the memory size requirements. In such instances, CharsetLen would be the length of the charset mapping table and instead of using the integer representation of the character, characters position in the charset mapping table is used.

Int CharMap[CharsetLen][MAX_COL_LEN]—for each character, this array has a list of locations in the target column value where that character occurs Int CharMapCount[CharsetLen]—for each character, this array contains a count of locations where that char occurs (i.e., the length of location list in CharMap)

Int CharConstant [MAX_COL_LEN] [CharsetLen]—for each location, count how many times each character occurs in each location Char Constant [MAX_COL_LEN]—the constant character for each location, '.backslash.0' otherwise Int ForwardCharMatch[MAX_COL_LEN][MAX_NUM_COLUMNS][MAX_COL_LEN]—for each location in target column value, keeps a count of how many times there is a matching character for each location in the source column value Int ReverseCharMatch[MAX_COL_LEN][MAX_NUM_COLUMNS][MAX_COL_LEN]—for each location in target column value, keeps a count of how many times there is a matching character for each reverse location in the source column value. Reverse location is counted from the end—e.g., 0 means the last character, 1 means the one before last, etc.

Int matchThreshold—% of rows that need to have a match for a location for it to be considered a match. Assumed to be >50%

Int constantThreshold—% of rows that need to have the same character in a target location for it to be considered a constant. Assumed to be >50%

Figure 6:
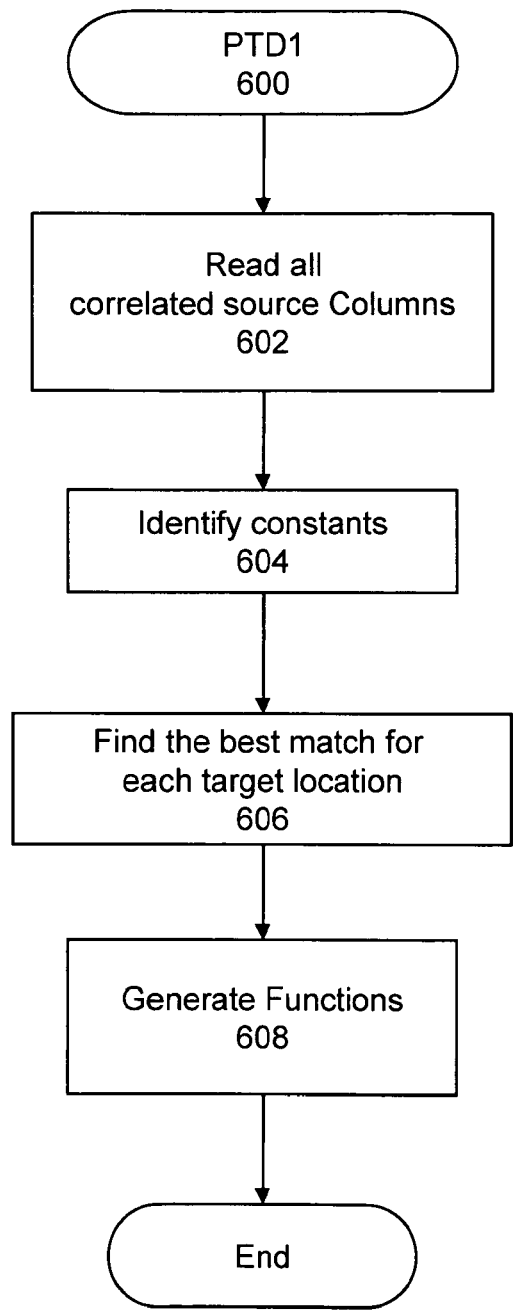
FIG. 6 illustrates a flow chart of an embodiment of a Positional Transformation Discovery process.

Int variableThreshold—% of rows that need to have a fixed value of target column for it to be considered variable length. VariableThreshold should be <ConstantThreshold Int NumberOfRows—number of rows in the target that have a matching row in source tables given the binding condition Structure Match—consists of the following fields
    Type—one of Forward, Reverse, Constant
    int column—source column
    int location—source location
    char constant
    Match Matches[MAX_COL_LEN][MAX_COL_LEND]—array of matches that has a list of matches for each target location
    MatchCount[MAX_COL_LEN]—number of matches for each target location in Matches array The Positional Transformation Discovery 1 (PTD1) process 600 is described below with respect to FIG. 6.

At block 602, for each target column, the process 600 reads all correlated source columns in a single select (i.e., select sourcecolumn1, sourcecolumn2, . . . , targetcolumn from sourcetable1, sourcetable2, . . . , targettable where BINDING_CONDITION order by targetcolumn). For each row, the process performs the following:
    a. Increment NumberOfRows
    b. Get the value of the target column—TVALUE
    c. SetCharConstant(TVALUE)
    d. If TVALUE is not the same as previous TVALUE (PTVALUE)
      i. Clear CharMap, CharMapCount
      ii. SetCharMap(TVALUE)
      iii. Reset PTVALUE=TVALUE
    e. For each source column
      i. Get value of source column UNTRIMMED_SVALUE
      ii. Trim blanks from the end SVALUE=rtrim(UNTRIMMED_SVALUE, ' ')
      iii. Get the column number SCOL
      iv. For each character in SVALUE
        1. Get char value: ScharValue
        2. Get char location: SForwardCharLocation
        3. Get reverse char location: SreverseCharLocation=Length(SVALUE)—-SForwardCharLocation
        4. Get count of entries in CharMap—TlocationCount=CharMapCount[ScharValue]
        5. For each entry Entry in CharMap
          a. Get target location TcharLocation=CharMap[Entry]
          b. Increment forward match count ForwardCharMatch[TcharLocation][SCOL][SForwardCharLocation]++
          c. Increment reverse match count ReverseCharMatch[TcharLocation][SCOL][SReverseCharLocation]++

At block 604, the process 600 identifies constants according to the following process:
    a. For each location ConstantLocation in CharConstants
      i. Set Constant[ConstantLocation]='.backslash.0'.—to indicate there is no constant
      ii. Set LocationCount=0
      iii. For each character ConstantCharacter
        1. Get the count ConstantCount of times character ConstantCharacter was in location ConstantLocation in target values
        2. Set LocationCount=LocationCount+ConstantCount
        3. If ConstantCount>ConstantThreshold*NumberOfRows
          a. Create a Match record M
            i. MType=Constant
            ii. MConstant=ConstantCharacter
          b. Add M to Matches
            i. count=MatchCount[ConstantLocation]
            ii. MatchCount[ConstantLocation]=count+1
            iii. Matches [ConstantLocation][Count]=M
      iv. If LocationCount<ConstantThreshold—we have reached the point where we will not find any more constants because we do not have enough values to overcome the threshold
        1. If LocationCount>VariableConstantThreshold—that means we have a variable length column and cannot do positional matching. Stop PTD1
        2. Else if LocationCount<VariableConstantThreshold, the values that are longer then LocationCount are too few to worry about. We should fix TargetColumnLength=ConstantLocation
        3. Stop constant identification At block 606, for each target location TLOCATION, the process 600 finds the best match according to the following process:
    b. For each source column SCOL
      i. For each source location SLOCATION
        1. get ForwardMatchCount=ForwardCharMatch[TLOCATION][SCOL][SLOCATIO-N]
        2. if ForwardMatchCount>matchThreshold
          a. Create a Match record M
            1. M.Type=Forward
            ii. M.Col=SCOL
            iii. M.Location=SLOCATION
          b. Add M to Matches
            i. count=MatchCount[TLOCATION]
            ii. MatchCount[TLOCATION]=count+1
            iii. Matches[TLOCATION] [count]=M
        3. get ReverseMatchCount=ReverseCharMatch[TLOCATION][SCOL][SLOCATIO-N]
        4. if ReverseMatchCount>matchThreshold
          a. Create a Match record M
            i. MType=Reverse
            ii. MCol=SCOL
            iii. MLocation=SLOCATION
          b. Add M to Matches
            i. count=MatchCount[TLOCATION]
            ii. MatchCount[TLOCATION]=count+1
            iii. Matches[TLOCATION][count]=M At block 608, the process 600 generates functions according to the following process:
    c. If MatchCount[TLOCATION] is 0 for any TLOCATION=0.
    TargetColumnLength
      i. STOP—we could not discover any positional transformations d. For each combination COMBINATION of matches (e.g., if TargetColumnLength=2 and MatchCount[ ]=2 and MatchCount[1]=3, we will have 6 combinations: {Match[0] [0], Match[1] [0]}, {Match[0] [0], Match[1] [1]}, . . . }. COMBINATION is array of Match records i. Start with FUNCTION=Empty string ii. Convert consecutive forward char matches into substring functions 1. if there are 1 or more Matches in locations Li=L 1 . . . LN such that COMBINATION[Li].Type=Forward and COMBINATION[Li].Col=COMBINATION[Li+−1]. Col and COMBINATION[Li].Location=COMBINATION[Li+1].Location−1 a. Create a substring function SUBSTRING=substring (ColName[Col], L1, LN−L1+1)

b. Add substring to function: FUNCTION=FUNCTION+SUBSTRING iii. Convert consecutive constants into constant strings 1. If there are 1 or more Constants in locations Li=L1 . . . LN such that COMBINATION[Li].Type=Constant a. Construct CONSTANT_STRING i. Set CONSTANT_STRING[0]=".backslash."

ii. For each Li in L1 . . . LN, set CONSTANT_STRING [L1−L1+1]=COMBINATION[Li].ConstatString iii. Set CONSTANT_STRING[L1−Li+2]=".backslash."

b. Add substring to function: FUNCTION=FUNCTION+CONSTANT_STRING iv. Convert consecutive reverse char matches into substring functions 1. if there are 1 or more Matches in locations Li=L1 . . . LN such that COMBINATION[Li].Type=Reverse and COMBINATION[Li].Col=COMBINATION[Li+−1].Col and COMBINATION[Li].Location=COMBINATION[Li+1].Location+1 a. Create a substring function SUBSTRING=substring(rtrim(ColName [Co−l]' '), length(rtrim(ColName[Col]), ' ')—LN+1, LN−L1+1)

b. Add substring to function: FUNCTION=FUNCTION+SUBSTRING iii. Token Transformation Discovery (TTD1) Algorithm Token Transformation Discovery Algorithm breaks values into tokens based on separator character set (SCS). In one embodiment, the token separator characters included: space, tab, newline, dash, forward slash, backward slash, comma, period, parenthesis, angle brackets, square brackets and figure brackets. A value is broken up into tokens as follows:

1. Start with Value V, empty Token List TL, empty Separator List SL, empty current Token T=null and empty current separator S=null 2. For each character C in value V, a. if C is in not in SCS i. if the current token T is empty (null)

1. copy current separator S to the separator list 2. set S=null 3. create a new token T ii. add C to the current token T b. if C is in SCS i. if current separator S is empty (null)

1. if current token T is not empty, copy it to the token list 2. set T=null 3. create a new Separator S ii. add C to S Once the values are tokenized, apply Positional Transformation Discovery Algorithm (PTD1) to the tokens and to the separators where character locations are local to the tokens or the separator rather than entire strings.

iv. Helper Processes

The helper processes, SetCharMap(VALUE) and SetCharConstant(VALUE) referenced above with respect to the PTD1 process, are now described in greater detail.

The SetCharMap(VALUE) process performs the following:

Given a string value VALUE, populate a CharMap array

For each character in VALUE

1. Get the character a. Set charLocation=CharLocation—location of the character in the value b. Set charValue=VALUE[CharLocation]—the character in the CharLocation in VALUE c. For example, if VALUE='Fred', the first character would have CharLocation=0, CharValue='F', the second character would have CharLocation=1 and CharValue='r'

2. Get the number of entries for that character in CharMap a. MapCount=CharMapCount[CharValue]

3. Add char location to CharMap a. CharMap[CharValue][MapCount]=CharLocation

4. Increment char count a. CharMapCount[CharValue]=MapCount+1

The SetCharConstant(VALUE) process performs the following:

Given a string value VALUE, populate CharConstant array

For each character in VALUE,

1. Get the character a. Set charLocation=CharLocation—location of the character in the value b. Set charValue=VALUE[CharLocation]—the character in the CharLocation in VALUE c. For example, if VALUE='Fred', the first character would have CharLocation=0, CharValue='F', the second character would have CharLocation=1 and CharValue='r'

2. Increment count in CharConstant array a. CharConstant [CharLocation] [CharValue]=CharConstant[CharLocation] [CharValue]+1

Note, the SetCharConstant(VALUE) process should be performed in conjunction with SetCharMap process, so we only go through the characters once.

Figure 7A:
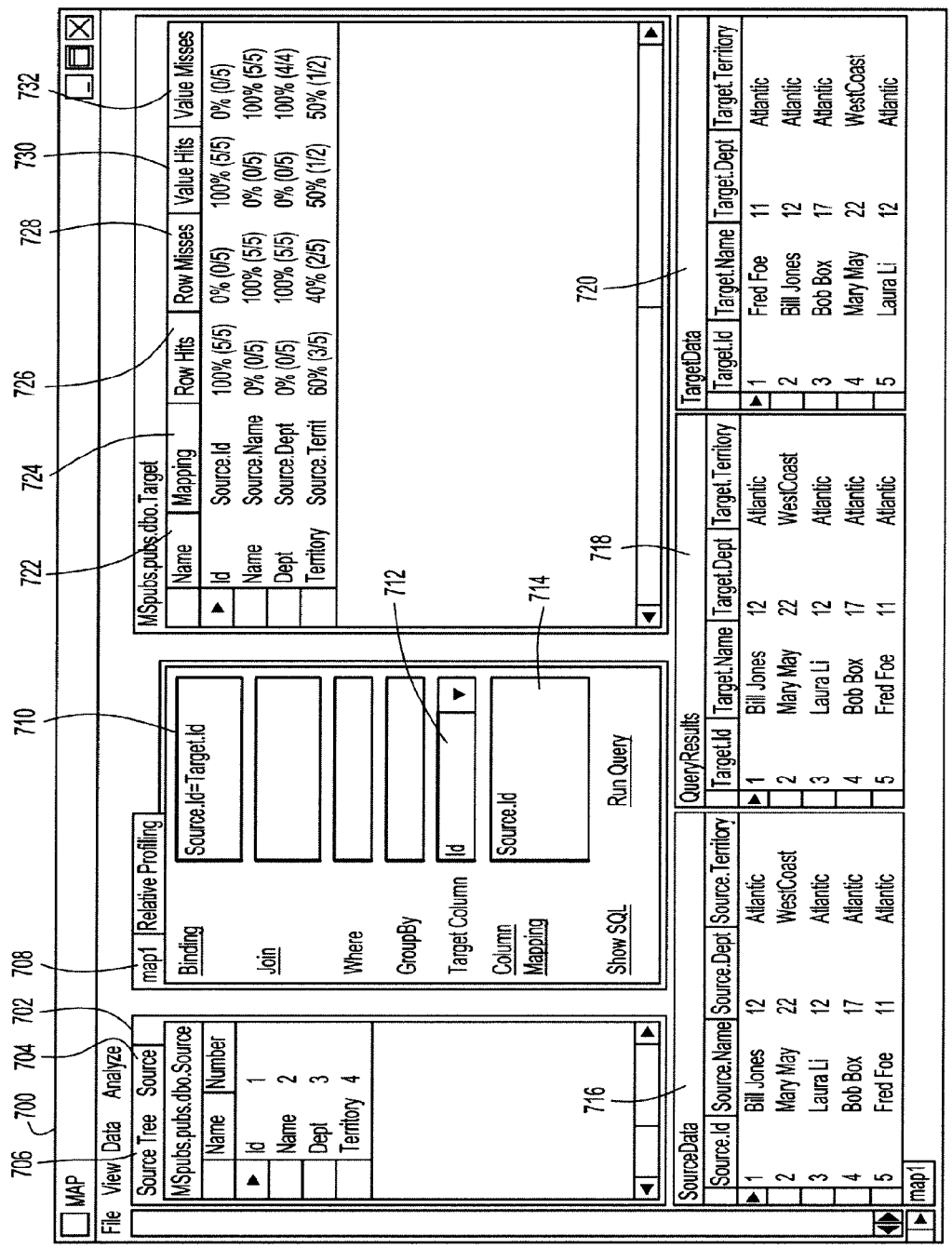
Figure 7B:
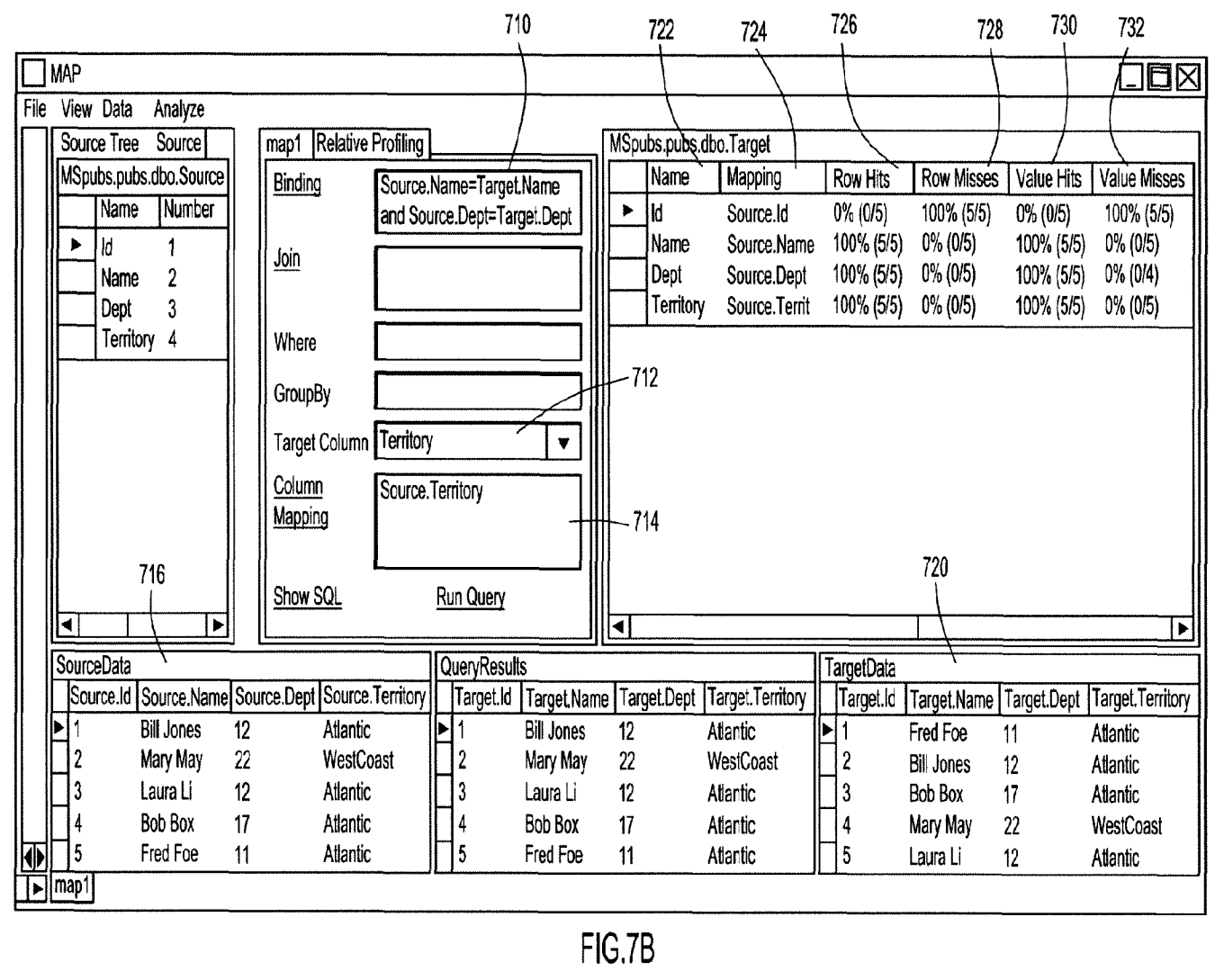
Figure 7C:
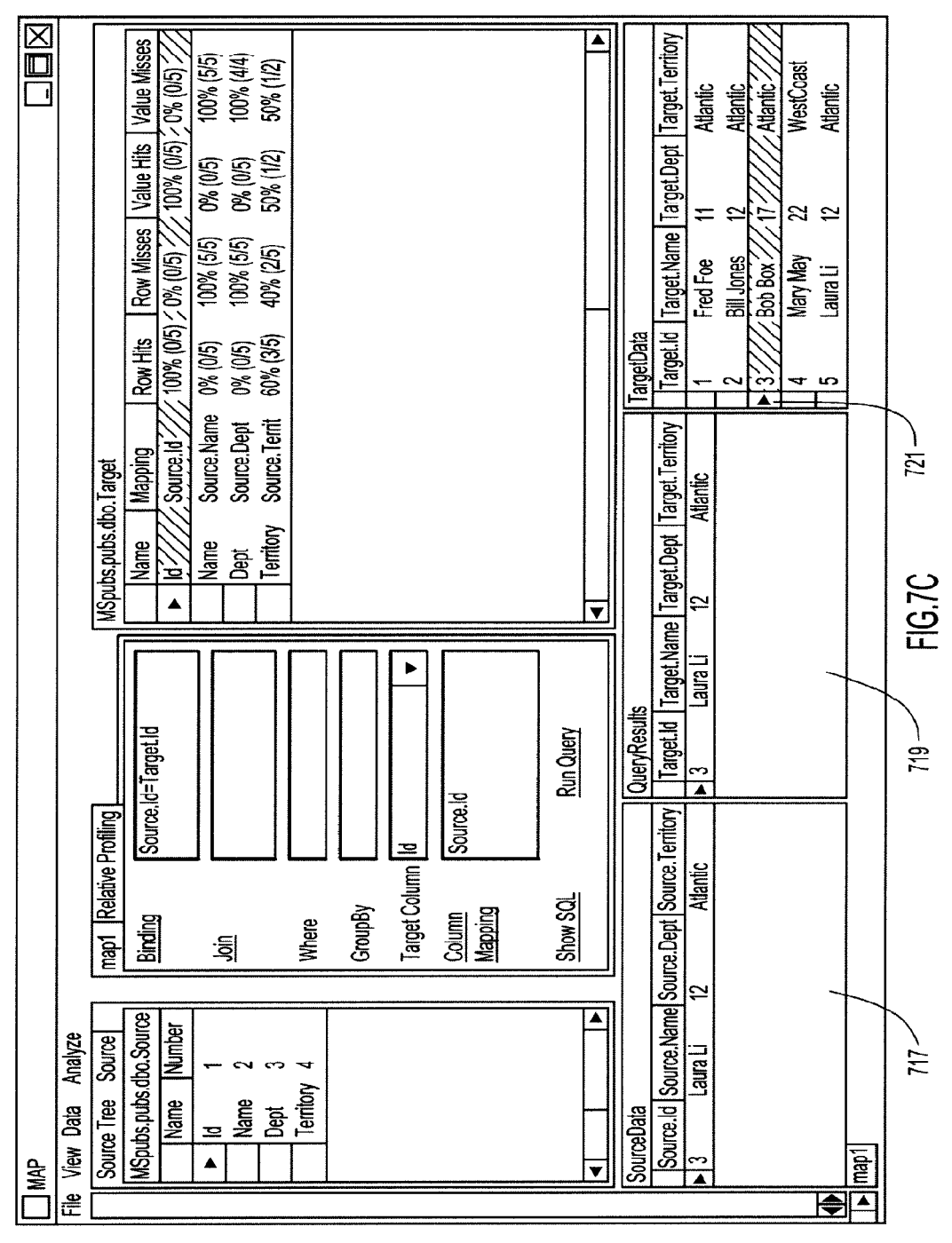

FIGS. 7A, 7B and 7C illustrate embodiments of a graphical user interface of the present invention. Referring to FIG. 7A, a main window 700 includes several subwindows. Subwindow 702 includes two tabbed views. A Source tab view 704 displays the columns of a current Source table which is being analyzed. A Source Tree tab 706 displays a Source Tree, from which a user may select a Source table to analyze.

Subwindow 708 displays current mapping parameters. A mapping query defined by the parameters in 708 transforms Source tables into Target tables. A Binding field 710 displays the current Binding Condition (e.g. Source.Id=Target Id). The Binding Condition "binds" (i.e. relates) instances of source and target on Natural Key. A Target Column pulldown menu 712 allows a user to select a Target column from a Target table, which is mapped (or transformed) to a Source column as indicated in the Column Mapping Field 714.

Source Data subwindow 716 displays the data from the current Source table. Target Data subwindow 720 displays the data from a Target table. A Query Results subwindow 718 displays the results of the query based on the mapping parameters specified in Subwindow 708.

Subwindow 722 displays the success for a particular mapping between the Source table and the Column table. This provides a user with readily available statistics for Binding Conditions, in order to facilitate the user's understanding of the data and schema. Column 724 displays the mapping (or transformations) based on the Binding Condition 710.

Column 726 displays Row Hits as both a percentage and a fractional representation for each column. Row Hits describes the proportion of Source rows that had the same values as corresponding Target rows for the particular Binding Condition, i.e. (# rows that match/# rows in a table). For example, in the example illustrated in FIG. 7A, the Binding Condition Source.Id=Target.Id results in a 100% or 5/5 correlation between the rows of the Source.Id column and the rows of the Target.Id column. For Source.Name and Source.Dept, there is a 0% or 0/0 correlation with the Target table based on the Binding Condition 710. This is because although the Binding Condition 710 is based on a Primary Key of the Source table (e.g. Source.Id), the Binding Condition 710 does not include a Global Id. For Source.Territory, there is only a 60% or 3/5 correlation. In other words, for the Binding Condition Source.Id=Target.Id, only in three instances did Source.Territory=Target.Territory. Row Hits provides a user with a quick sampling of the success for a particular mapping. For example, in the example illustrated in FIG. 7A, the results in the Row Hits column 726 quickly inform a user that there were no matches based on the Binding Condition 710.

Column 728 displays Row Misses as both a percentage and a fractional representation for each column. Row Misses describes the proportion of Source rows that did not have the same values as corresponding Target rows for the particular binding Condition, i.e. (# rows that did not match/# rows in a table).

Column 730 displays Value Hits as both a percentage and a fractional representation for each column. Value Hits describes the proportion of unique matching Source and Target values to the number of unique values, i.e. (# unique values that Match/# unique values). For example, for Source id, there were five matches between unique values, and a total of five unique values, hence 100% or 5/5 Value Hits. However, for Source.Territory, there was only one unique match, and a total of two unique values (e.g. Atlantic and West Coast). Thus there was a Value Hits score of 50% or ½.

Column 732 displays Value Misses as both a percentage and a fractional representation for each column. Value Misses describes the proportion of unique non-matching Source and Target values to the number of unique values, i.e. (# unique values that do match/# unique values).

FIG. 7B illustrates another embodiment of the user interface of FIG. 7A. In the sample of FIG. 7B, the Binding Condition 710 is set on natural keys, Source.Name=Target.Name and Source.Dept=Target.Dept. Additionally, the Target Column 712 is set to the Territory column of the Target Data 720, and is mapped to the Source.Territory column of the Source Data 716 as indicated in the Column Mapping Field 714. The results shown in Subwindow 722 indicate that there are matches for Name, Dept and Territory columns, and validate the appropriateness of the mapping defined in Subwindow 708.

FIG. 7C illustrates another embodiment of the user interface of FIG. 7A. In FIG. 7C, a focus function is illustrated. A focus function allows a user to investigate the results of a particular mapping. In one embodiment, a user may focus on Source Row to show corresponding Mapping Query Results Row and Target Row. In another embodiment, a user may focus on a Target Row to show corresponding Mapping Query Results Row and Source Row. For example, when a user selects a particular row 721 from Subwindow 720 (focus row), this row is highlighted and the source data 717 which is bound to the driver row 721 is displayed in the Source Data 716, and the query results 719 based on the bound source data 717 is displayed in the Query Results subwindow 718. The focus function allows a user to easily identify why there are no matches for a particular mapping, thus increasing the efficiency of determining appropriate mapping parameters.

The particular methods and processes of embodiments of the invention are described herein in terms of computer software with reference to a series of flow charts. The methods constitute computer programs made up of computer-executable instructions illustrated as blocks (acts). Describing the methods by reference to a flow diagram enables one skilled in the art to develop such programs including such instructions to carry out the methods on suitably configured computers (the processor of the computer executing the instructions from computer-readable media, including memory). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be appreciated that more or fewer processes may be incorporated into the methods described without departing from the scope of the invention and that no particular order is implied by the arrangement of blocks shown and described herein.

Figure 8:
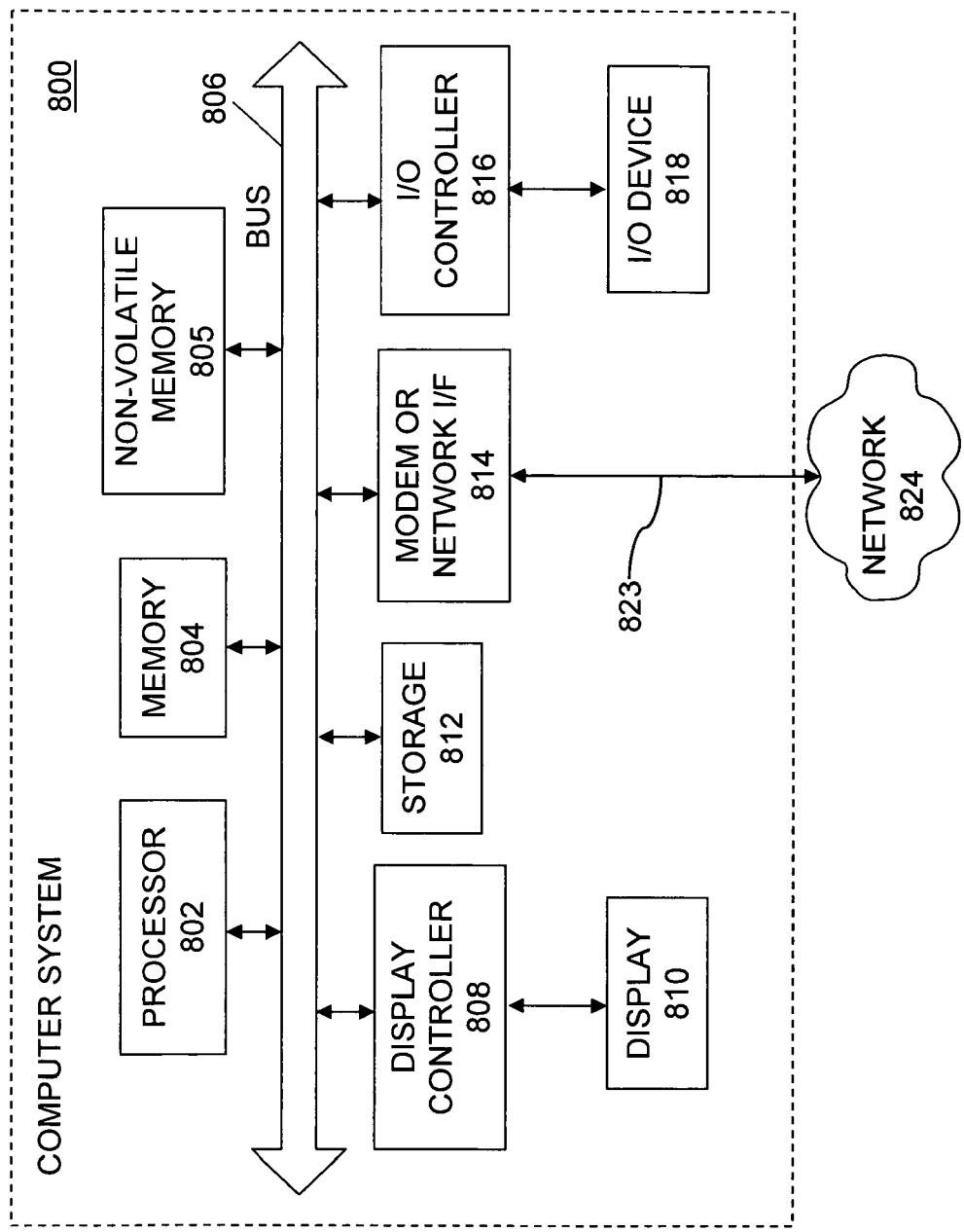
FIG. 8 illustrates an embodiment of a computer system on which the present invention may be implemented.

FIG. 8 is an illustration of one embodiment of an example computer system 800 on which embodiments of the present invention may be implemented. In one embodiment, computer system 800 is a conventional server computer system. Computer system 800 includes a processor 802 coupled to a bus 806. Memory 804, storage 812, non-volatile storage 805, display controller 808, input/output controller 816 and typically a modem or network interface 814 are also coupled to bus 806. The computer system 800 interfaces to external systems through the modem or network interface 814. This interface 814 may be an analog modem, Integrated Services Digital Network (ISDN) modem, cable modem, Digital Subscriber Line (DSL) modem, a T-1 line interface, a T-3 line interface, token ring interface, satellite transmission interface, or other interfaces for coupling a computer system to other computer systems. A carrier wave signal 823 is received/transmitted by modem or network interface 814 to communicate with computer system 800. In the embodiment illustrated in FIG. 1, carrier waive signal 823 is used to interface computer system 800 with a computer network 824, such as a local area network (LAN), wide area network (WAN), or the Internet. In one embodiment, computer network 824 is further coupled to a remote computer (not shown), such that computer system 800 and the remote computer can communicate.

Processor 802 may be a conventional microprocessor including, but not limited to, an Intel Corporation (trademark) x86, Pentium (trademark), or Itanium (trademark) family microprocessor, a Motorola (trademark) family microprocessor, or the like. Memory 804 may include, but not limited to, Dynamic Random Access Memory (DRAM), Static Random Access Memory (SRAM), Synchronized Dynamic Random Access Memory (SDRAM), Rambus (trademark) Dynamic Random Access Memory (RDRAM), or the like. Display controller 808 controls in a conventional manner a display 810, which in one embodiment may be a cathode ray tube (CRT), a liquid crystal display (LCD), and active matrix display or the like. An input/output device 818 coupled to input/output controller 816 may be a keyboard, disk drive, printer, scanner and other input and output devices, including a mouse, trackball, trackpad, joystick, or other pointing device.

The computer system 800 also includes non-volatile memory 805 on which firmware and/or data may be stored. Non-volatile memory devices include, but are not limited to Read-Only Memory (ROM), Flash memory, Erasable Programmable Read Only Memory (EPROM), Electronically Erasable Programmable Read Only Memory (EEPROM), or the like.

Storage 812 in one embodiment may be a magnetic hard disk, an optical disk, or another form of storage for large amounts of data. Some data may be written by a direct memory access process into memory 804 during execution of software in computer system 800. It is appreciated that software may reside in storage 812, memory 804, non-volatile storage 805 or may be transmitted or received via modem or network interface 814.

For the purposes of the specification, a machine-readable medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-readable medium includes, but is not limited to, recordable/non-recordable media (e.g., a read only memory (ROM), a random access memory (RAM), a magnetic disk storage media, an optical storage media, a flash memory device, etc.). In addition, a machine-readable medium can include propagated signals such as electrical, optical, acoustical or other form of propagated signals (e.g., carrier waves, infrared signals, digital signals, etc.).

It will be appreciated that computer system 800 is one example of many possible computer systems that have different architectures. For example, computer systems that utilize the Microsoft (trademark) Windows operating system in combination with Intel microprocessors often have multiple buses, one of which may be considered a peripheral bus. Network computers may also be considered as computer systems that may be used with the present invention. Network computers may not include a hard disk or other mass storage, and the executable programs are loaded from a wired or wireless network connection into memory 804 for execution by processor 802. In addition, handheld or palmtop computers, which are sometimes referred to as personal digital assistants (PDAs), may also be considered as computer systems that may be used with the present invention. As with network computers, handheld computers may not include a hard disk or other mass storage, and the executable programs are loaded from a wired or wireless network connection into memory 804 for execution by processor 802. A typical computer system will usually include at least a processor 802, memory 804, and a bus 806 coupling memory 804 to processor 802.

It will also be appreciated that in one embodiment, computer system 800 is controlled by operating system software that includes a file management system, such as a disk operating system, which is part of the operating system software. For example, one embodiment of the present invention utilizes Microsoft (trademark) Windows as the operating system for computer system 800. In other embodiments, other operating systems that may also be used with computer system 800 include, but are not limited to, the Apple Macintosh (trademark) operating system, the Linux (trademark) operating system, the Microsoft (trademark) Windows CE operating system, the Unix (trademark) operating system, the 3Com Palm (trademark) operating system, or the like.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method for determining a mapping between a plurality of columns of a first data source and a second data source by using a fuzzy match, the method comprising:
   identifying a join condition between the plurality of columns of the first data source and the second data source;
   constructing source data objects based on a set of relationships between the plurality of columns of the first data source and the second data source and the identified join condition;
   determining a fuzzy match between the plurality of columns of the first data source and the second data;
   identifying the mapping corresponding to the fuzzy match between the plurality of columns of the first data source and the second data source; and
   generating a window providing a display of success for the mapping between the columns of the first data source and the second data source.

2. The method as recited in claim 1, wherein the determining the fuzzy match comprises:
   matching the columns of the first data source with the second data source;
   identifying a score based on degree of matching of the columns of the first data source with the columns of the second data source; and
   identifying a binding condition based on the score of matching, when the score of matching is more than a threshold.

3. The method as recited in claim 1, wherein identifying the join condition between the plurality of columns of the first data source and the second data source, comprises:
   discovering key columns, wherein the key columns are based on a unique index of the columns in the first data source and the second data source; and
   discovering a foreign key, wherein the foreign key is based on value match between the discovered key columns.

4. A method for determining a mapping between a plurality of columns of a first data source and a second data source by using a fuzzy match, the method comprising:
   identifying a join condition between the plurality of columns of the first data source and the second data source;
   constructing source data objects based on a set of relationships between the plurality of columns of the first data source and the second data source and the identified join condition;
   determining a fuzzy match between the plurality of columns of the first data source and the second data source by performing:

identifying a list of pre-loaded synonyms corresponding to the columns in the first data source;

comparing the list of pre-loaded synonyms to the columns in the second data source;

identifying a relevancy score based on the comparison between the list of the pre-loaded synonyms and the columns in the second data source; and determining the mapping based on the relevancy score; and identifying the mapping corresponding to the fuzzy match between the plurality of columns of the first data source and the second data source.

5. The method as recited in claim 4, wherein the mapping is used to identify a binding condition between the first data source and the second data source.

6. The method as recited in claim 4, wherein the list of synonyms is discovered.

\* \* \* \* \*

UNITED STATES PATENT AND TRADEMARK OFFICE
CERTIFICATE OF CORRECTION

PATENT NO. : 8,874,613 B2
APPLICATION NO. : 13/891130
DATED : October 28, 2014
INVENTOR(S) : Gorelik et al.

Page 1 of 1

It is certified that error appears in the above-identified patent and that said Letters Patent is hereby corrected as shown below:

On the title page item [56], References Cited (56), column 1, page 3, line 41 delete "Response to Office Action 1 for US Application No. 12/165,549, dated September 3, 2013, 10 pp. [57.300 (ROA1)]" insert --Response to Office Action 1 for US Application No. 13/435,352, dated September 3, 2013, 10 pp. [57.300 (ROA1)]-- and

On the title page item [56], column 2, line 42 delete "Final Office Action 1 for US Application No. 12/165,549, dated October 31, 2013, 17 pp. [57.300 (FOA1)]" insert --Final Office Action 1 for US Application No. 13/435,352, dated October 31, 2013, 17 pp. [57.300 (FOA1)]--

Signed and Sealed this
Sixth Day of October, 2015

Michelle K. Lee
*Director of the United States Patent and Trademark Office*